United States Patent
Jang

(10) Patent No.: US 10,819,904 B2
(45) Date of Patent: Oct. 27, 2020

(54) IMAGE PROCESSING DEVICE AND IMAGE PROVIDING METHOD THEREFOR

(71) Applicant: Hanwha Techwin Co., Ltd., Seongnam-si (KR)

(72) Inventor: Se Mi Jang, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/345,818

(22) PCT Filed: Nov. 21, 2016

(86) PCT No.: PCT/KR2016/013400
§ 371 (c)(1),
(2) Date: Apr. 29, 2019

(87) PCT Pub. No.: WO2018/088608
PCT Pub. Date: May 17, 2018

(65) Prior Publication Data
US 2019/0268537 A1    Aug. 29, 2019

(30) Foreign Application Priority Data

Nov. 8, 2016 (KR) .......................... 10-2016-0148189

(51) Int. Cl.
*H04N 5/232* (2006.01)
*G06F 3/0482* (2013.01)
(Continued)

(52) U.S. Cl.
CPC ....... *H04N 5/23229* (2013.01); *G06F 3/0482* (2013.01); *G06F 3/0488* (2013.01);
(Continued)

(58) Field of Classification Search
CPC ..................... H04N 7/18–188; G03B 13/196
See application file for complete search history.

(56) References Cited

U.S. PATENT DOCUMENTS

| 6,509,926 B1 | 1/2003 | Mills et al. |
| 8,107,594 B2 | 1/2012 | Bennett, III et al. |

(Continued)

FOREIGN PATENT DOCUMENTS

| KR | 10-2011-0086380 A | 7/2011 |
| KR | 10-2013-0003886 A | 1/2013 |

(Continued)

OTHER PUBLICATIONS

International Search Report dated Jul. 20, 2017 by the International Searching Authority in counterpart International Patent Applicoation No. PCT/KR2016/013400. (PCT/ISA/210).

(Continued)

*Primary Examiner* — Paul M Berardesca
(74) *Attorney, Agent, or Firm* — Sughrue Mion, PLLC

(57) ABSTRACT

Provided are an image processing device and an image providing method therefor. The image providing method performed by the image processing device includes setting a privacy mode of each of a plurality of registered objects; obtaining a first image of a monitoring zone from a camera; changing to a privacy mode of an object first appearing in the monitoring zone among the plurality of registered objects; and in the privacy mode, in response to a request for the first image from at least one of the remaining objects, generating a second image in which a privacy zone preset by the appearing object is processed in the first image.

20 Claims, 23 Drawing Sheets

(51) Int. Cl.
- *G06F 3/0488* (2013.01)
- *G06F 21/32* (2013.01)
- *G06T 3/40* (2006.01)
- *G06K 9/00* (2006.01)
- *G06F 21/36* (2013.01)

(52) U.S. Cl.
CPC .............. *G06F 21/32* (2013.01); *G06F 21/36* (2013.01); *G06K 9/00* (2013.01); *G06T 3/40* (2013.01); *H04N 5/23296* (2013.01); *H04N 5/232933* (2018.08); *H04N 5/232945* (2018.08)

(56) References Cited

U.S. PATENT DOCUMENTS

| | | |
|---|---|---|
| 9,172,919 B2 | 10/2015 | Berlic et al. |
| 9,179,058 B1 | 11/2015 | Zeira et al. |
| 9,319,635 B2 | 4/2016 | Huang et al. |
| 2010/0149330 A1* | 6/2010 | Salgar .............. G08B 13/19686 348/143 |
| 2012/0098854 A1* | 4/2012 | Ohnishi ................. G03B 21/26 345/626 |
| 2014/0023248 A1 | 1/2014 | Yoo et al. |
| 2014/0140575 A1 | 5/2014 | Wolf |
| 2016/0148016 A1 | 5/2016 | Rylski |

FOREIGN PATENT DOCUMENTS

| | | |
|---|---|---|
| KR | 10-1338341 B1 | 12/2013 |
| KR | 10-2014-0012474 A | 2/2014 |
| KR | 10-1624983 B1 | 5/2016 |

OTHER PUBLICATIONS

Written Opinion dated Jul. 20, 2017 by the International Searching Authority in counterpart International Patent Appliocation No. PCT/KR2016/013400. (PCT/ISA/237).

Communication dated May 29, 2020, issued by the European Patent Office in counterpart European Application No. 16921406.1.

* cited by examiner

IMAGE PROCESSING DEVICE AND IMAGE PROVIDING METHOD THEREFOR

TECHNICAL FIELD

The present disclosure relates to an image processing device and an image providing method therefor.

BACKGROUND ART

In recent years, security issues have greatly increased as the number of services on the web increases. Such security problems have raised a problem of privacy invasion of a security camera, a fear of hacking, etc.

DESCRIPTION OF EMBODIMENTS

Technical Problem

Provided is a security system capable of satisfying both privacy invasion and security without being one-sided.

Solution to Problem

According to an aspect of the present disclosure, an image providing method includes setting a privacy mode of each of a plurality of registered objects; obtaining a first image of a monitoring zone from a camera; changing to a privacy mode of an object first appearing in the monitoring zone among the plurality of registered objects; and in the privacy mode, in response to a request for the first image from at least one of the remaining objects, generating a second image in which a privacy zone preset by the appearing object is processed in the first image.

The privacy zone may include one of an entirety of the first image, a part of the first image, and the appearing object.

At least one of a size, a shape, and a position of the privacy zone may be changed in the first image.

The changing to the privacy mode may include in the first image, when one of a detection of the appearing object, a voice recognition of the appearing object, and a face recognition of the appearing object preset by the appearing object is satisfied, changing to the privacy mode set by the appearing object.

The image providing method may further include detecting a first touch of a mark indicating a menu hide status provided on a screen from a terminal of at least one of the plurality of registered objects and providing a wheel key in which at least one menu centered on a position of the first touch is displayed to the screen; and detecting a second touch on the wheel key and performing a function of a menu corresponding to a position of the second touch.

The performing of the function of the menu may include when the menu corresponding to the position of the second touch is a privacy setting, receiving privacy information comprising a change condition to the privacy mode and a setting of the privacy zone; and matching the privacy information with an object that inputs the first and second touch.

The receiving of the privacy information may include providing a block overlapped with the first image for zone designation; and receiving an input to designate a zone surrounded by the block or a zone other than the zone surrounded by the block in the first image as the privacy zone.

The performing of the function of the menu may include when the menu corresponding to the position of the second touch is an event viewing, requesting authentication of an object requesting a privacy event which is an event occurring in the privacy zone upon receiving a request for the privacy event; and allowing viewing of the privacy event when the object requesting the privacy event is authenticated as the appearing object.

The image providing method may further include detecting a third touch of a mark indicating a menu hide status provided on a screen from a terminal of at least one of the plurality of registered objects and providing a navigation key overlapped with the first image in response to the third touch; and detecting a fourth touch of the navigation key and controlling a view of the camera with a coordinate value corresponding to the fourth touch.

According to an aspect of the present disclosure, an image processing device includes a setting unit configured to set a privacy mode of each of a plurality of registered objects; a mode change unit configured to change to a privacy mode of an object first appearing in a monitoring zone among the plurality of registered objects; and a masking unit configured to, in the privacy mode, in response to a request for a first image of the monitoring zone obtained by a camera from at least one of the plurality of registered objects, generate a second image in which a privacy zone preset by the appearing object is processed in the first image.

The privacy zone may include one of an entirety of the first image, a part of the first image, and the appearing object.

At least one of a size, a shape, and a position of the privacy zone may be changed in the first image.

The mode change unit may be further configured to, in the first image, when one of a detection of the appearing object, a voice recognition of the appearing object, and a face recognition of the appearing object preset by the appearing object is satisfied, change to the privacy mode set by the appearing object.

The setting unit may be further configured to detect a first touch of a mark indicating a menu hide status provided on a screen from a terminal of at least one of the plurality of registered objects and provide a wheel key in which at least one menu centered on a position of the first touch is displayed to the screen; and detect a second touch on the wheel key and perform a function of a menu corresponding to a position of the second touch.

The setting unit may be further configured to, when the menu corresponding to the position of the second touch is a privacy setting, receive privacy information comprising a change condition to the privacy mode and a setting of the privacy zone; and match the privacy information with an object that inputs the first and second touch.

The setting unit may be further configured to provide a block overlapped with the first image for zone designation; and receive an input to designate a zone surrounded by the block or a zone other than the zone surrounded by the block in the first image as the privacy zone.

The setting unit may be further configured to, when the menu corresponding to the position of the second touch is an event viewing, request authentication of an object requesting a privacy event which is an event occurring in the privacy zone upon receiving a request for the privacy event; and allow viewing of the privacy event when the object requesting the privacy event is authenticated as the appearing object.

The setting unit may be further configured to detect a third touch of a mark indicating a menu hide status provided on a screen from a terminal of at least one of the plurality of registered objects and provide a navigation key overlapped with the first image in response to the third touch; and detect a fourth touch of the navigation key and control a view of the camera with a coordinate value corresponding to the fourth touch.

Advantageous Effects of Disclosure

The embodiments may provide a security system capable of satisfying both privacy invasion and security without being one-sided.

BEST MODE

Figure 1:
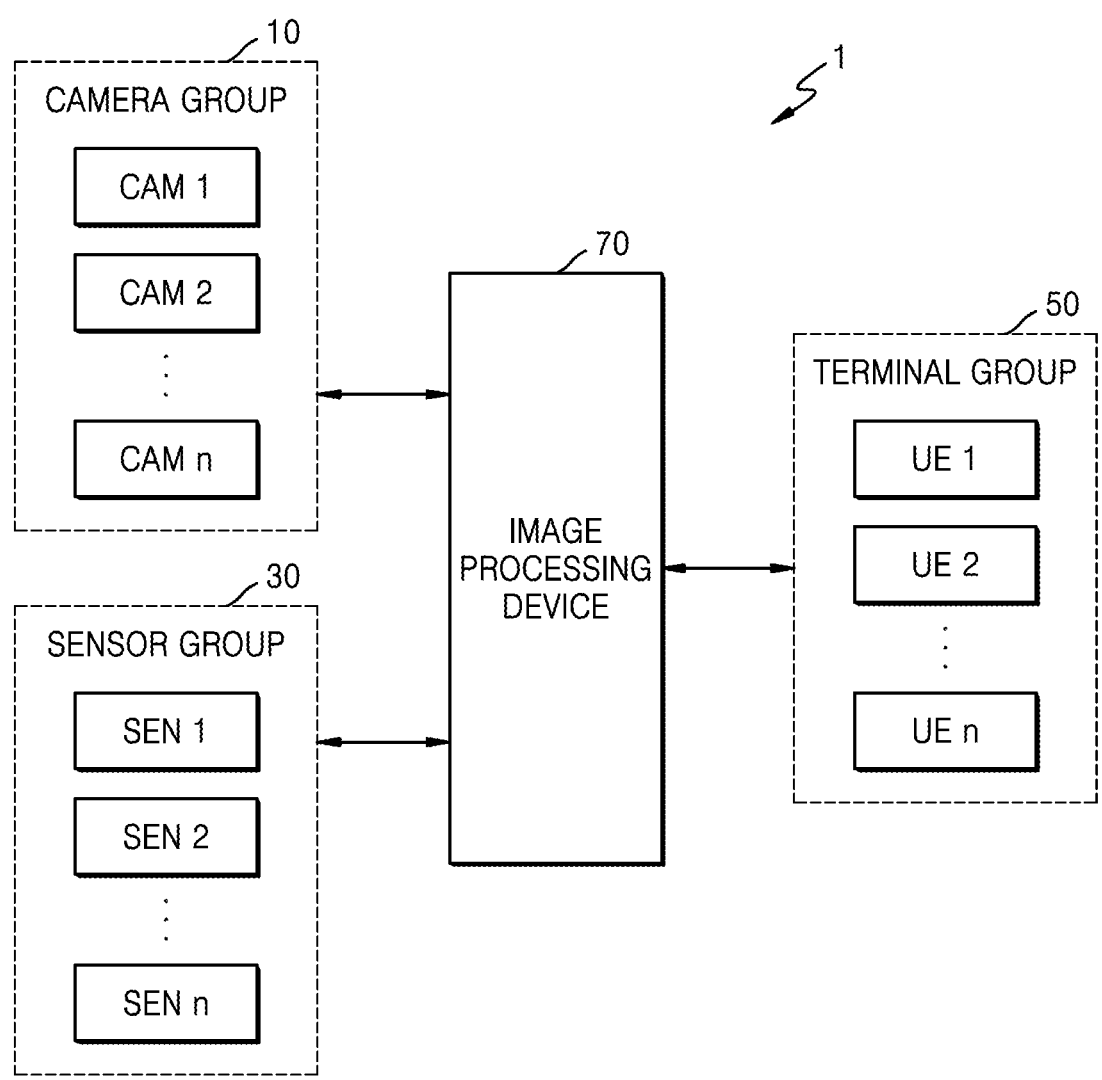
FIG. 1 is a schematic view of a security system according to an embodiment of the present disclosure.

An image providing method includes setting a privacy mode of each of a plurality of registered objects; obtaining a first image of a monitoring zone from a camera; changing to a privacy mode of an object first appearing in the monitoring zone among the plurality of registered objects; and in the privacy mode, in response to a request for the first image from at least one of the remaining objects, generating a second image in which a privacy zone preset by the appearing object is processed in the first image.

Mode of Disclosure

Various alterations and modifications may be made to embodiments, some of which will be illustrated in detail in the drawings and detailed description. However, it should be understood that these embodiments are not construed as limited to the illustrated forms and include all changes, equivalents, or alternatives within the idea and the technical scope of the present disclosure. However, in the following descriptions and the accompanying drawings, descriptions of well-known functions and constructions will be omitted when they are considered to unnecessarily obscure the gist of the present disclosure.

Also, it will be understood that although the terms "first", "second", etc. may be used herein to describe various components, these components should not be limited by these terms. These components are only used to distinguish one component from another.

The terminology used herein is for the purpose of describing particular embodiments only and is not intended to limit the scope of the present disclosure. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

The present disclosure may be described in terms of functional block components and various processing operations. Such functional blocks may be realized by any number of hardware and/or software components configured to perform the specified functions. For example, the present disclosure may employ various integrated circuit components, e.g., memory elements, processing elements, logic elements, look-up tables, and/or the like, which may carry out a variety of functions under the control of one or more microprocessors or other control devices. Similarly, where the elements of the present disclosure are implemented using software programming or software elements the present disclosure may be implemented with any programming or scripting language such as C, C++, Java, assembler, and/or the like, with the various algorithms being implemented with any combination of data structures, objects, processes, routines or other programming elements. Functional aspects may be implemented in algorithms that execute on one or more processors. Furthermore, the present disclosure may employ any number of conventional techniques for electronics configuration, signal processing and/or control, data processing and/or the like. The terms "mechanism" and "element" are used in a broad sense and are not limited to mechanical or physical embodiments, but may include software routines in conjunction with processors, and/or the like.

FIG. 1 is a schematic view of a security system according to an embodiment of the present disclosure.

Referring to FIG. 1, the security system 1 may include a camera group 10, a sensor group 30, a terminal group 50, and an image processing device 70.

The camera group 10 may include at least one camera CAM1 through CAMn. The at least one camera CAM1 to CAMn may be a PTZ camera at a fixed position of a specific place and having pan/tilt/zoom functions. The at least one camera CAM1 to CAMn may obtain various images while panning and/or tilting by using a driving device or adjusting a zoom magnification by zooming in or zooming out a zoom lens. The at least one camera CAM1 to CAMn may be installed inside or outside banks or public buildings requiring security or outdoors such as parks, etc. as well as offices, houses, and hospitals, and may have various shapes such as a straight shape, a dome shape, etc. according to an installation place and a use purpose.

The at least one camera CAM1 to CAMn may detect an object while monitoring a zone allocated thereto. The at least one camera CAM1 to CAMn may be given an ID as unique identification information. When an unauthorized object is detected, the at least one camera CAM1 to CAMn may track the object and transmit an event generation signal to at least one terminal UE1 to UEn of the image processing device 70 and/or at least one terminal UE1 to UEn of the terminal group 50.

The sensor group 30 may include at least one sensor SEN1 to SENn. The at least one sensor SEN1 to SENn may be a plurality of heterogeneous sensors that obtain different sensing data. The at least one sensor SEN1 to SENn may include an audio sensor, a motion sensor, a fingerprint sensor, an iris sensor, and the like. The at least one sensor SEN1 to SENn may be installed by pairing with the at least one camera CAM1 to CAMn. However, when the at least one camera CAM1 to CAMn has a motion recognition and tracking function, the at least one sensor SEN1 to SENn may be installed independently.

The terminal group 50 may include the at least one user terminal UE1 to UEn. The at least one user terminal UE1 to UEn may be given an ID as unique identification information. The ID may be mapped to biometric information used to authenticate an individual such as a face, a voice, a fingerprint, an iris, etc. The at least one user terminal UE1 to UEn may receive an input from each user and transmit the input to the image processing device 70 and display data received from the image processing device 70 on a screen.

The at least one user terminal UE1 to UEn may be a mobile terminal such as a laptop, a handheld device, a smart phone, a tablet, etc. a desktop computer, or any other suitable device using such a device, or directly or indirectly connected thereto.

The image processing device 70 may receive an image and sensing data input to the camera group 10 and/or the sensor group 30. The image processing device 70 may perform a privacy function according to the embodiments of the present disclosure. The image processing device 70 may analyze the received image and perform blind processing on the image partly or wholly. The image processing device 70 may store the received original image and the blind-processed image. The image processing device 70 may selectively provide the original image and/or the blind-processed image to the at least one user terminal UE1 to UEn according to an access right set to a user. The image processing device 70 may analyze the received image and/or received sensing data and detect an event. The image processing device 70 may provide an alarm to the at least one terminal UE1 to UEn when the event is detected.

The image processing device 70 may receive at least one of an ID/password, biometric information and a pattern from the at least one user terminal UE1 to UEn and compare the ID/password, the biometric information and the pattern with a previously stored ID/password, previously stored biometric information and a previously stored pattern to authenticate the user.

The image processing device 70 may receive biometric information input from the at least one camera CAM1 to CAMn and/or the at least one sensor SEN1 to SENn and identify the user. The image processing device 70 may perform the privacy function set by the identified user.

In an embodiment, the image processing device 70 may be implemented as a microchip embedded in the at least one camera CAM1 to CAMn or a circuit board having a microchip.

In another embodiment, the image processing device 70 may be connected with the at least one camera CAM1 to CAMn, the at least one sensor SEN1 to SENn, and the at least one user terminal UE1 to UEn through a communication network, e.g., LAN and TCP/IP. The communication network may include a wired network and a wireless network including wireless Internet such as 3G, 4G (LTE), WiFi, Wibro, and Wimax, etc. and near distance communication such as Bluetooth, Radio Frequency Identification (RFID), infrared data communication (IrDA), Ultra Wideband (UWB), ZigBee, and the like. The image processing device 70 may be a wireless access device supporting a Wi-Fi communication method and/or an LTE communication method, a relay device such as a gateway, a recording device such as a digital video recorder (DVR) or a network video recorder (NVR), etc., a cloud computing device providing a storage function over the Internet, and the like.

At least some of components constituting the image processing device 70 may be implemented by software or circuits including at least one of an operating system, an application program module, and other program modules.

A typical privacy function is simply a function of turning off a camera when a family member comes in a house or directing the camera out of the house or in a specific direction. In this case, when a crime occurs at that time, the camera may not store an image, which may cause a problem that deviates from the intent of installation for the purpose of a security camera. That is, the user may be in a situation of alternatives of privacy protection and security. When the user is at home alone and a person tries to connect to the camera, although a function of blocking connection by an alarm may be predicted, this also causes a problem that the user who wants to relax easily receives an alarm continuously and is interrupted frequently.

The embodiment of the present disclosure may be applied when one of the registered members is alone in a monitoring zone and wants to protect the privacy of the individual while maintaining security.

Figure 2:
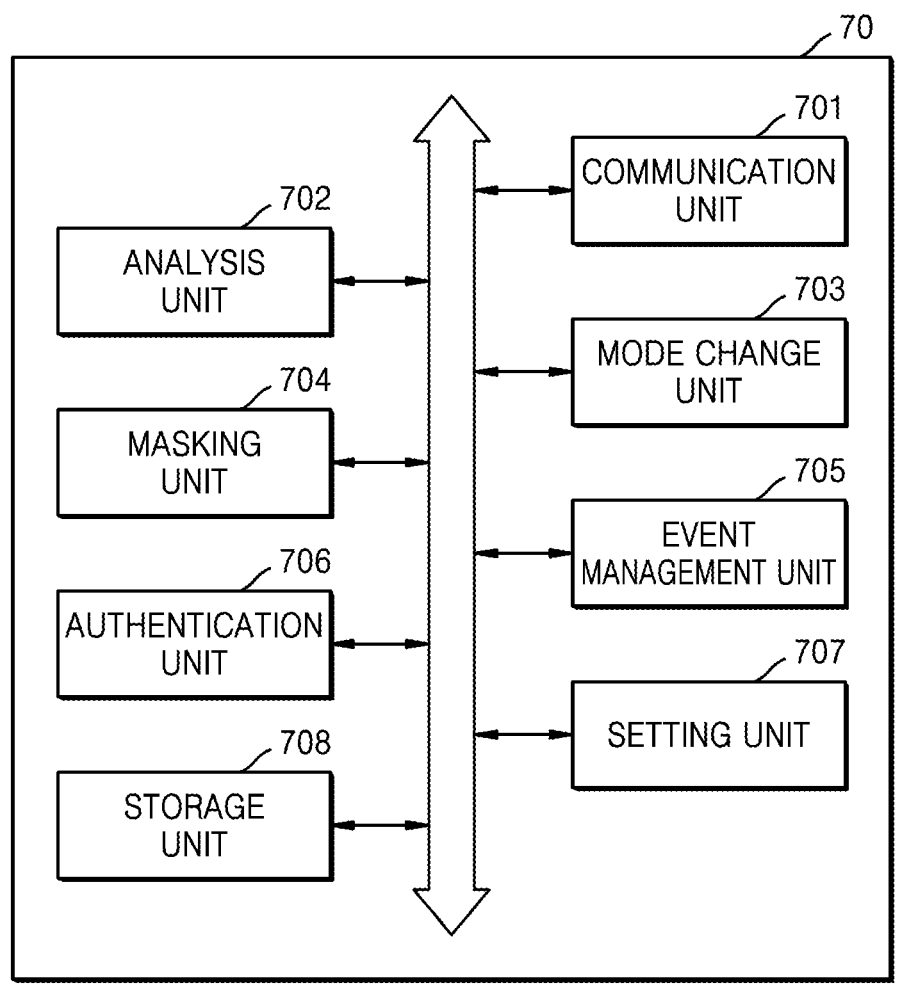
FIG. 2 is a block diagram schematically showing a configuration of an image processing device according to an embodiment of the present disclosure.

FIG. 2 is a block diagram schematically showing a configuration of the image processing device according to an embodiment of the present disclosure.

Referring to FIG. 2, the image processing device 70 may include a communication unit 701, an analysis unit 702, a mode change unit 703, a masking unit 704, an event management unit 705, an authentication unit 706, a setting unit 707, and a storage unit 708.

The communication unit 701 may be an apparatus including hardware and software necessary to transmit/receive a signal such as a control signal or a data signal through a wired/wireless connection with an external device, but the scope of the present disclosure is not limited thereto. The communication unit 701 may include a first communication module transmitting and receiving data to and from the camera group 10 and the sensor group 30 and a second communication module transmitting and receiving data to and from the terminal group 50.

The first communication module may receive an image from the camera group 10 and receive sensing data from the sensor group 30. The sensing data may include voice data, fingerprint data, and iris data. The first communication module may transmit a camera control signal including a PTZ value to the camera group 10.

The second communication module may receive user authentication information from the at least one user terminal UE1 to UEn and may transmit a real-time image or a stored image in response to an image request signal from an authenticated user. The second communication module may provide a privacy function setting menu in response to a privacy function execution request from the at least one user terminal UE1 to UEn and may receive setting data.

The analysis unit 702 may analyze original data including the input image and the sensing data to recognize biometric information and identify registered and unregistered objects by comparing the recognized biometric information with reference biometric information. The biometric information may include at least one of a face, a voice, a fingerprint, and an iris. The registered object is a user who owns and uses a terminal of the terminal group 50.

The analysis unit 702 may analyze the original data and generate an event when an event generation condition is satisfied. Here, an event refers to an event set by the user such as an appearance of the unregistered object, an appearance of a face of which recognition is impossible, a generation of an abnormal sound source (for example, a glass cracking sound, an alarm sound, a collision sound, a shout, a scream, a crying sound, etc.), a generation of voice greater than a threshold value, etc.

The analysis unit 702 may generate metadata representing an analysis result of the original data. The metadata may include text-based metadata or image-based metadata. The metadata may include original data information and event information. The original data information may include an image-obtaining time and object information detected in the image. The event information may include an event type, an event occurrence zone, and an event occurrence time.

The mode change unit 703 may change a monitoring mode of a monitoring zone to a normal mode or an auto-privacy mode. The normal mode is a mode in which the original data is provided to the terminal group 50. The original data may include image quality-improved data such as noise reduction. The auto-privacy mode is a mode in which data (hereinafter, referred to as 'privacy data') processed to add a privacy function to the original data is provided to the terminal group 50. An image obtained during the normal mode and the auto-privacy mode may be provided to a user terminal in real time in the live view mode.

The mode change unit 703 may change from the normal mode to the auto-privacy mode when one (hereinafter, referred to as a 'first registration user') of the users of the at least one user terminal UE1 to UEn appears in the monitoring zone by one of automatic execution, voice recognition execution, and face recognition execution according to a condition previously set by the first registration user.

The auto-privacy mode may include a first mode in which an entire zone of the image is processed as a privacy zone, a second mode in which a part of the image set by the first registration user is processed as the privacy zone, and a third mode in which the first registered user is processed as the privacy zone. The mode change unit 703 may execute the auto-privacy mode as one of the first mode to the third mode according to the setting of the first registration user.

The masking unit 704 may generate privacy data obtained by blind processing of the privacy zone on the original data in the auto-privacy mode. The privacy data may include a privacy image obtained by blind processing an original image. The original image and the privacy image may include an audio signal. The masking unit 704 may blind process an entire zone of the image as the privacy zone in the first mode. The masking unit 704 may blind process a part of the image set as the privacy zone in the second mode. The masking unit 704 may blind process the first registration user as the privacy zone in the third mode. The blind-processed zone in the first mode and the second mode is fixed but the blind-processed zone in the third mode may be changed in size, shape and position according to a movement of the user.

Blind processing may include mosaic processing of the privacy zone, outline processing, transparent/opaque processing inside the outline, color and shape change, blur processing, a replacement or an overlay to a replacement image, etc. but is not limited thereto, and various methods for a viewer not to identify the blind-processed zone.

The event management unit 705 may generate an alarm when the event occurs. The event management unit 705 may transmit the alarm to each terminal of the terminal group 50 in a text or e-mail format.

The event management unit 705 may receive an event occurrence from the analysis unit 702 and classify events according to a predetermined criterion. The classification criteria may include a date of an occurrence, a zone of an occurrence, a location of an occurrence, and the like. The event management unit 705 may classify events generated in the privacy zone during the auto-privacy mode as privacy events and manage the events by matching the events to the corresponding users. The event management unit 705 may not classify events generated in a zone other than the privacy zone as the privacy events during the auto-privacy mode but may classify the events according to the classification criteria similar to events generated during the normal mode. The event management unit 705 may provide data of a time when an event occurs or data of a predetermined period of time including the time when the event occurs as event data in response to an event playback request.

The event management unit 705 may provide the classified events as a group when there is an event view and/or retrieval request from the user. For example, the event management unit 705 may group and provide the events by date, by zone (e.g., a living room, a room 1, a room 2, . . . ), and location (e.g., a location designated by the user such as a part of the living room). The event management unit 705 may provide the privacy events as a group. The events may be represented as text or a still image such as a thumbnail. The events may be provided to one or more groups redundantly.

The event management unit 705 may provide event data obtained by removing blind processing from or restored from privacy data or event data generated from the original data to an authenticated user who is permitted to view the privacy event. The event management unit 705 may block viewing of the privacy event or provide event data generated from the privacy data to an unauthenticated user who is not permitted to view the privacy event.

The authentication unit 706 may register a network device information (such as a network interface controller (NIC) MAC address or Bluetooth MAC address) of the at least one user terminal UE1 to UEn as an ID and register a password of the user. The authentication unit 706 may perform login authentication and event view authentication of the user.

When a login request is received from the at least one user terminal UE1 to UEn, the authentication unit 706 may request user authentication information and perform login authentication of the user based on the received authentication information. The authentication information for login may include the ID/password of the user and/or biometric information of the user.

The authentication unit 706 may request the user authentication information and provide the privacy event to a user terminal that is successfully authenticated when a privacy event view request is received from the at least one user terminal UE1 to UEn. The authentication information for viewing the privacy event may further include key information for blind removal or blind recovery in addition to the authentication information for login.

The setting unit 707 may provide a setting menu when a function setting request is received from the at least one user terminal UE1 to UEn. When the privacy setting request is received, the setting unit 707 may provide a window for selecting one of the first to third modes and a window for selecting a privacy execution method. Upon receiving privacy information including a privacy mode change condition and a privacy zone setting from the user, the setting unit 707 may set the privacy function by matching the privacy information with a user of a terminal requesting the setting. Accordingly, the privacy function may be set differently for each user, and thus the auto-privacy mode based on the user may be performed.

The storage unit 708 may function to temporarily or permanently store data processed by the image processing device 70, instructions, a program, program code, or a combination thereof. The storage unit 708 may include at least one type of storage medium of a flash memory type memory, a hard disk type memory, a multimedia card micro type memory, a card type memory (for example, SD or XD memory), RAM, and ROM. Also, the storage unit 708 may be a web storage that performs a storage function on the Internet. The storage unit 708 may store images from the camera group 10 and sensing data from the sensor group 30. The storage unit 708 may store event data including privacy data and privacy event data. The storage unit 708 may store the metadata.

The image processing device 70 may output the real time image and the image stored in the storage unit 708 to the user terminal and/or a display unit (not shown) connected to the image processing device 70 through the communication unit 701. In an embodiment, the image output method may include a method of transmitting the image to an application capable of controlling a security system and outputting the image to a user terminal screen, a method of streaming and outputting the image to a TV or a set top box, a method of outputting the image to a screen through VGA or a connected HDMI cable, a method of outputting the image using a projection function included in a home security system, and the like.

FIGS. 3A to 16 are diagrams showing an example of a privacy function provided by an image processing device to a user terminal according to an embodiment of the present disclosure. Hereinafter, for convenience of explanation, one user terminal of the at least one user terminal UE1 to UEn will be described as an example. Also, hereinafter, for convenience of explanation, the example will be explained by applying to home security.

Figure 3A:
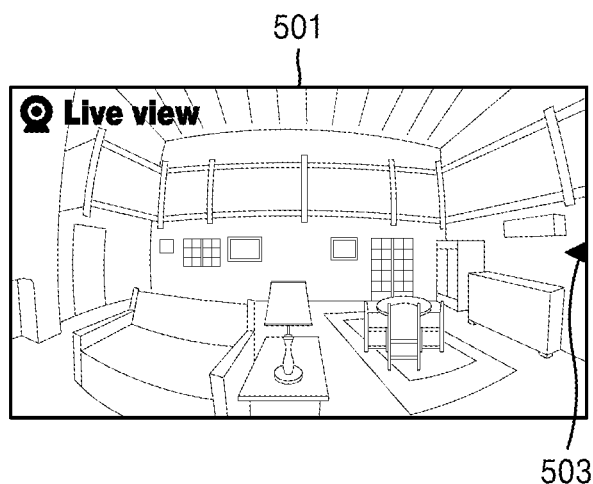
FIGS. 3A to 16 are diagrams showing an example of a privacy function provided by an image processing device to a user terminal according to an embodiment of the present disclosure.
Figure 3B:
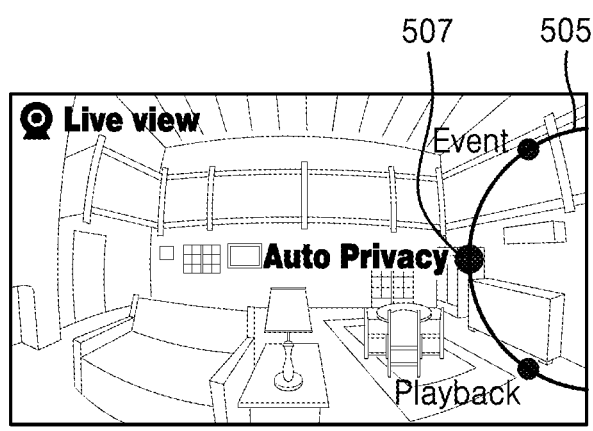
Figure 3C:
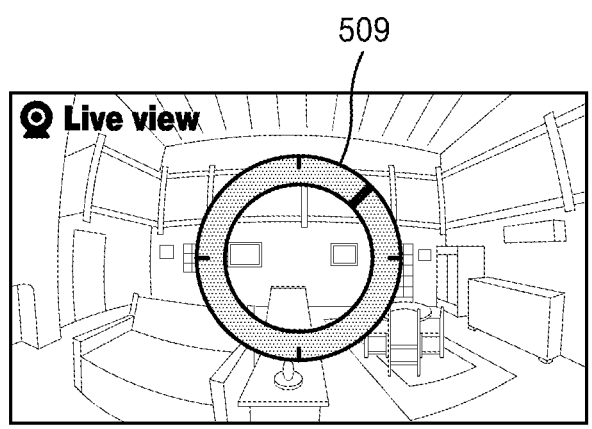

FIGS. 3A to 3C are diagrams illustrating an example of a menu provided by an image processing device to a user terminal according to an embodiment of the present disclosure.

Referring to FIG. 3A, the user terminal may execute a monitoring application to connect to the image processing device and display an image of a monitoring zone from the image processing device on a screen 501 of the user terminal in a live view. When the monitoring application is executed, the image processing device may provide a menu hide icon 503, which is a mark indicating a menu hide status on one side of the screen 501. In FIG. 3A, the menu hide icon 503 may overlap an image on the screen 501 to be provided on a right side of the screen 501 as a triangle but is not limited thereto. The menu hide icon 503 may be displayed on a left side, an upper side, a lower side, a corner, etc. as a predetermined figure such as a circle or a rectangle, and the like. A user may drag the menu hide icon 503 along a border (an outline) of the screen 501 to move the menu hide icon 503 to a desired position. Also, the menu hide icon 503 may be provided on a screen boundary in a direction in which the user pushes a menu on the screen 501 out of the screen 501. The menu hide icon 503 may be opaque or transparent. By allowing the menu hide icon 503 to occupy a minimum space, the user may avoid being disturbed by a view.

Referring to FIG. 3B, when the user touches the menu hide icon 503, the image processing device may detect a touch and overlap and provide a semicircular wheel key 505 with an image with respect to a touch point. The wheel key 505 may be provided with at least one menu 507 at a predetermined space. When the user touches the one menu 507 provided on the wheel key 505, the image processing device may detect the touch and execute a function of a menu corresponding to a touch location. In FIG. 3B, a privacy menu Auto Privacy for setting a privacy function, a menu Event for viewing an event, and a menu Playback for playing back a stored image are provided to the wheel key 505 at a predetermined space. A position of the menu may be fixed or changed each time the wheel key 505 is displayed.

Referring to FIG. 3C, when the user drags the menu hide icon 503 into the screen 501 while touching the menu hide icon 503, the image processing device may overlap and provide a circular navigation key 509 with an image. The navigation key 509 is a menu for 360-degree panning control of a camera. A size and position of the navigation key 509 may be changed by the user.

Figure 4:
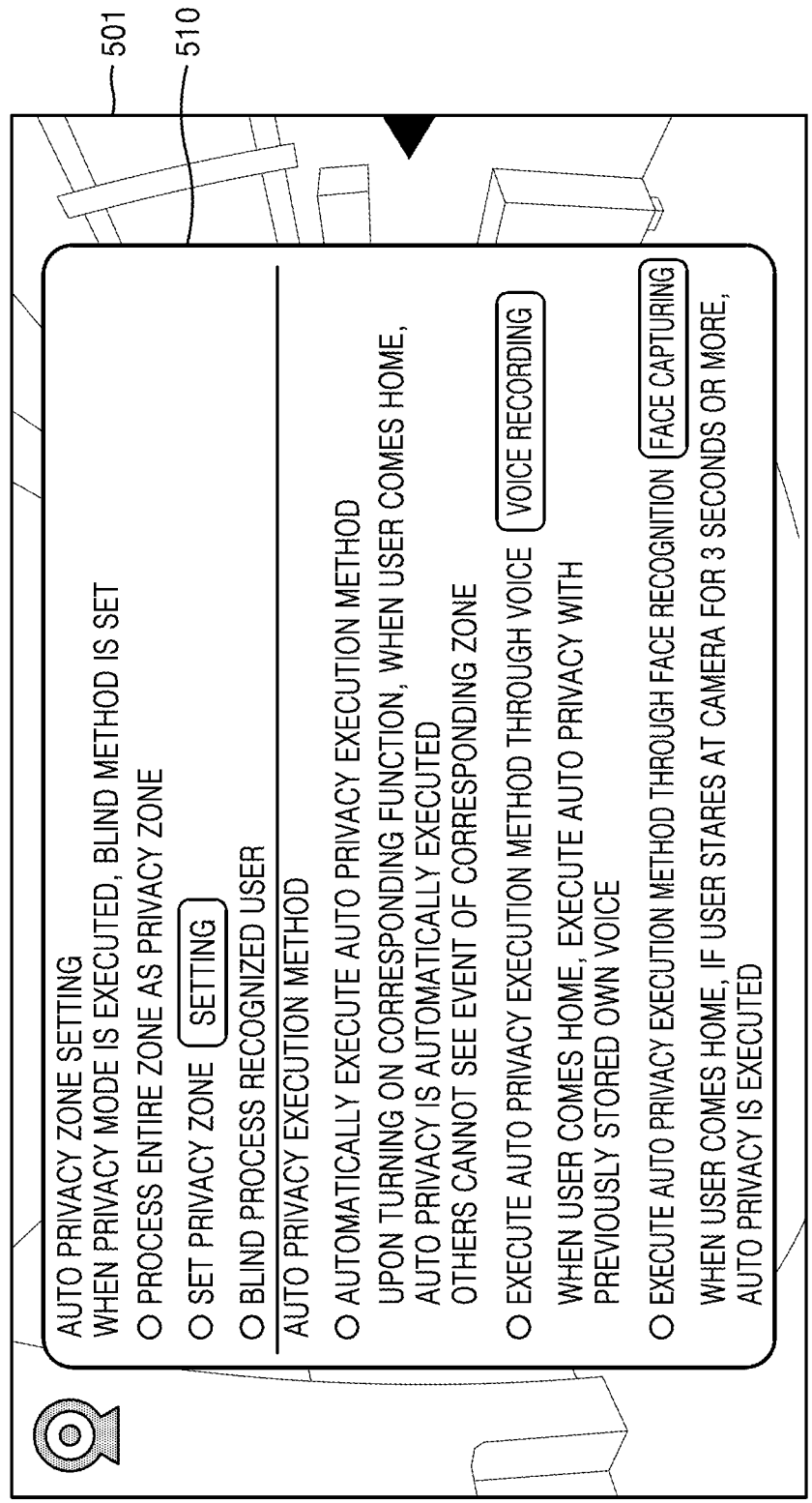

FIG. 4 is a diagram illustrating an example of a privacy function setting menu provided by an image processing device according to an embodiment of the present disclosure.

Referring to FIG. 4, when a user selects a privacy menu among the menus 507 of the wheel key 505 shown in FIG. 3B, the image processing device may provide a setting window 510 used to set a privacy zone and a privacy mode change condition to the screen 501. The setting window 510 may overlap an image displayed on the screen 501.

The user may set the privacy zone by selecting one of a first mode in which an entire image is processed as the privacy zone, a second mode in which only a zone set by the user is processed as the privacy zone, and a third mode in which the user is processed as the privacy zone, in the setting window 510.

The user may set the privacy mode change condition by selecting one of an automatic execution of an automatic change to the privacy mode when the user is recognized to appear in a monitoring zone, a voice recognition execution of a change to the privacy mode when a voice of the user is recognized, and a face recognition execution of a change to the privacy mode when a face of the user is recognized, in the setting window 510.

Figure 5:
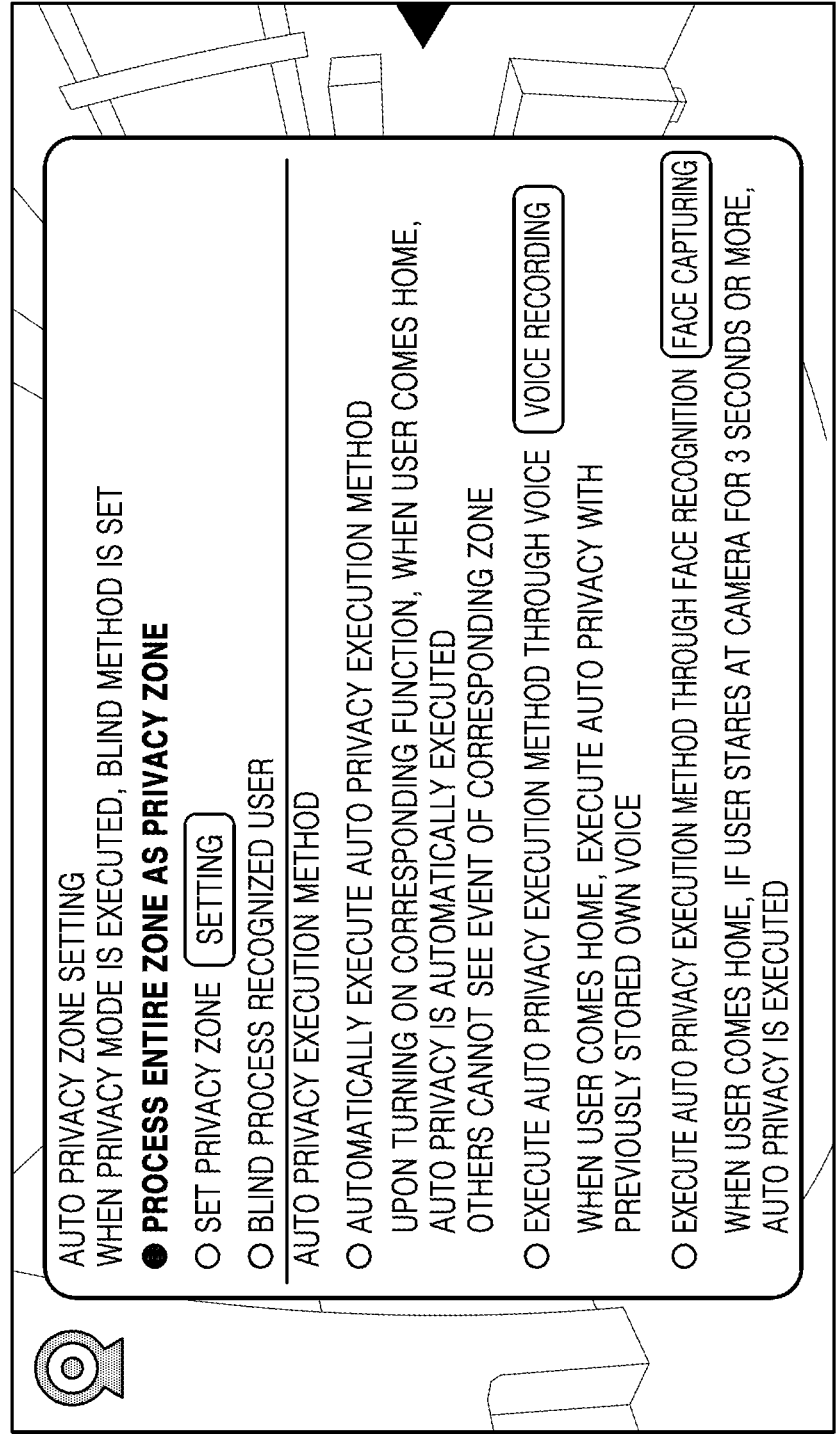

FIG. 5 illustrates an example in which a user selects a first mode in the setting window 510.

Referring to FIG. 5, when the user selects the first mode, a menu item of the selected first mode is indicated in bold such that the user may confirm his/her selection. An image processing device may receive a selection of the first mode and set a privacy mode of the user to the first mode in which all zones of an image are a privacy zone. When the user who sets the first mode comes indoors, the image processing device may perform blind processing on all the zones of the image and stream and store the blind-processed image. The user who sets the first mode may reconstruct an event that occurs in the privacy zone later. The first mode may provide a sense of assurance that the user is not exposed to the user who considers privacy and provide an option to reconstruct the event to the user seeking privacy and security at the same time, thereby satisfying needs for each user.

Figure 6:
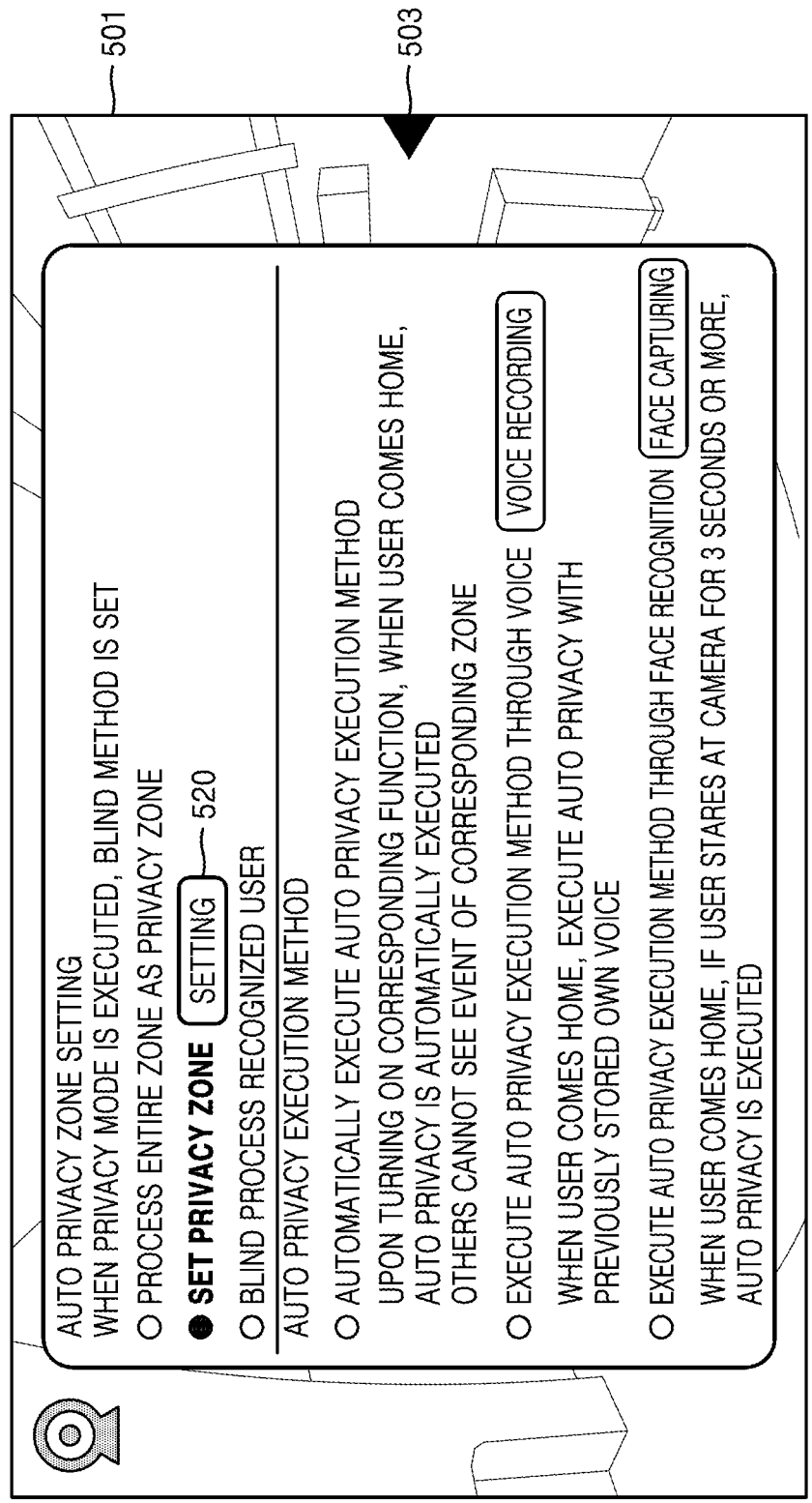

FIG. 6 illustrates an example in which a user selects a second mode in the setting window 510.

Referring to FIG. 6, when the user selects the second mode, a menu item of the selected second mode is indicated in bold, and a setting icon 520 may be activated.

FIGS. 7A to 7F illustrate examples of privacy zone setting.

Figure 7A:
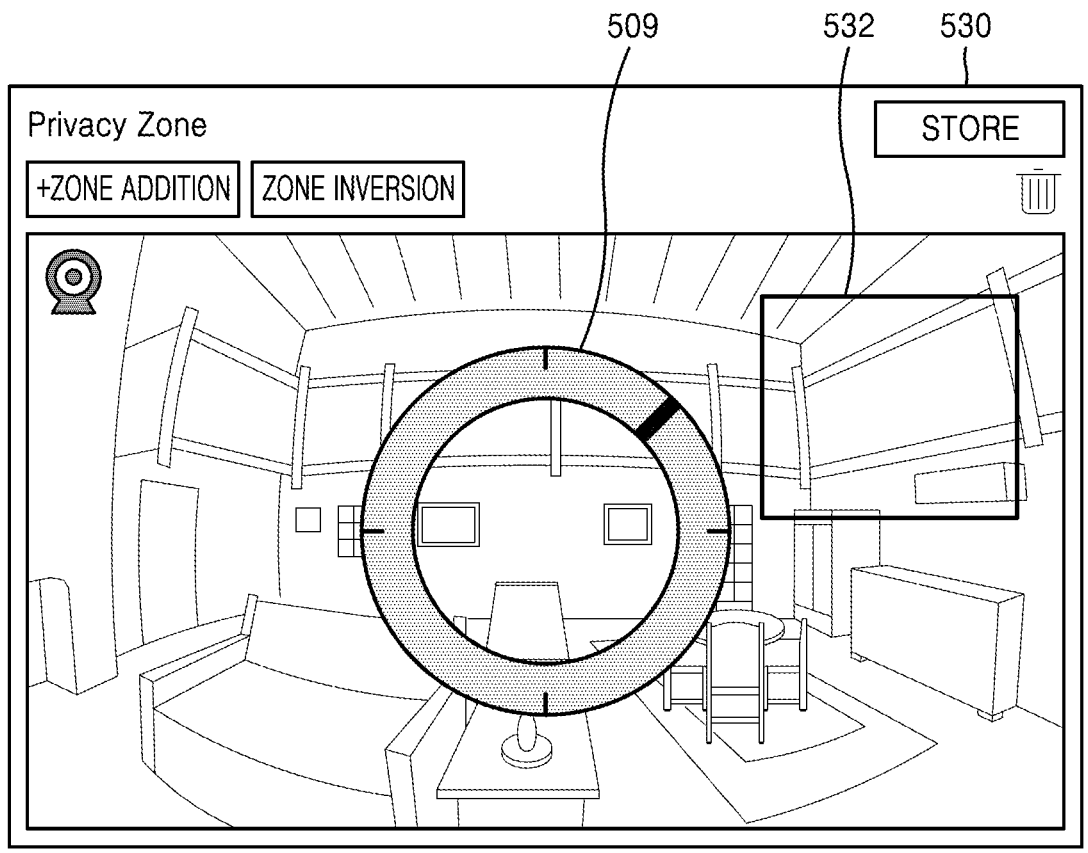

Referring to FIG. 7A, when a user selects a setting icon 520 shown in FIG. 6, the image processing device may overlap and provide a window 530 for designating a privacy zone with the setting window 510. The image processing device may provide an image obtained by a current camera and a zone designation block 532 to the window 530. The user may touch and drag the menu hide icon 503 to cause the navigation key 509 to overlap the window 530. The user may use the navigation key 509 to control a direction of the camera and control a camera view.

Figure 7B:
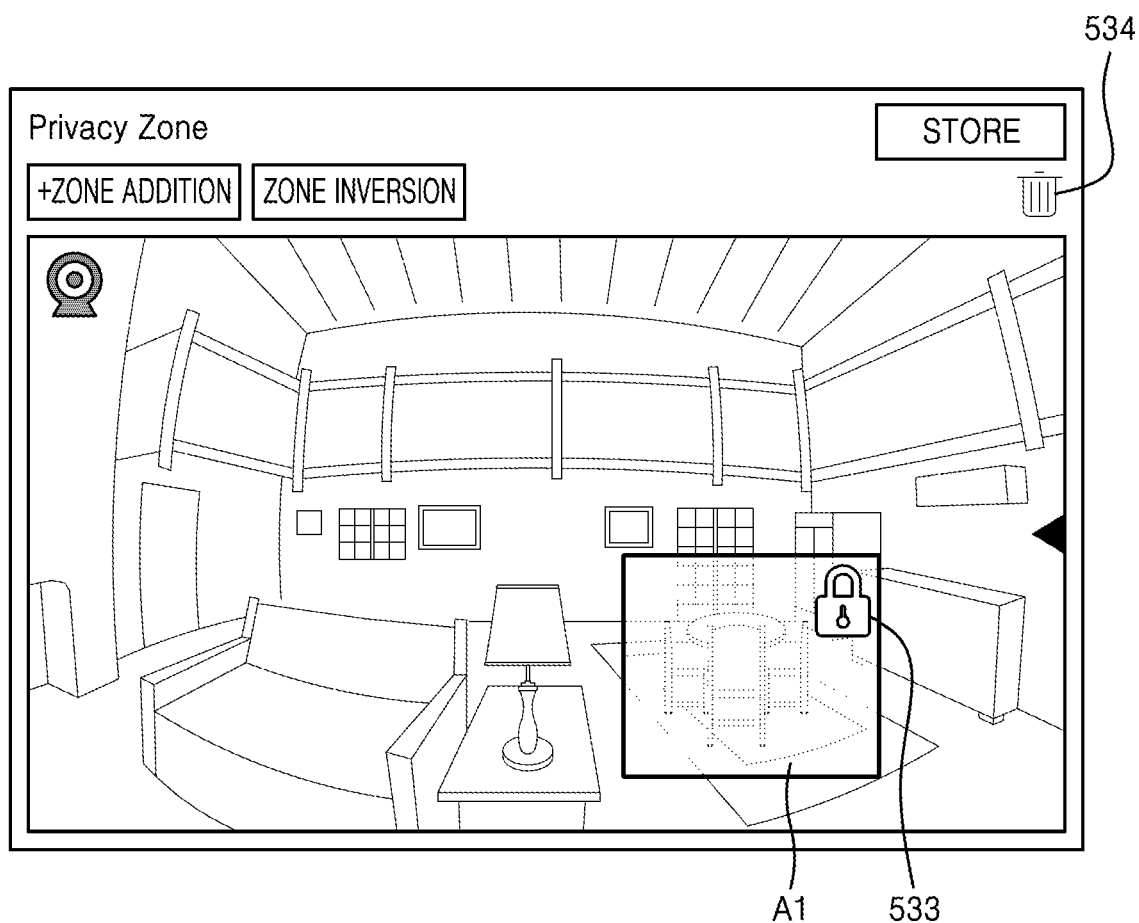

Referring to FIG. 7B, the user may move the zone designation block 532 in a currently displayed image to designate a zone surrounded by the zone designation block 532 as a privacy zone. The user may freely designate the zone by zooming in or out while dragging a boundary of the zone designation block 532. Information (e.g., an ID or a thumbnail) of the user using a privacy function, a lock mark 533, zone identification information (e.g., privacy zone #) in the form of text, etc. may be displayed on the designated privacy zone. The user may initialize and release a privacy zone designation by dragging and moving the designated privacy zone to a deletion mark 534.

Figure 7C:
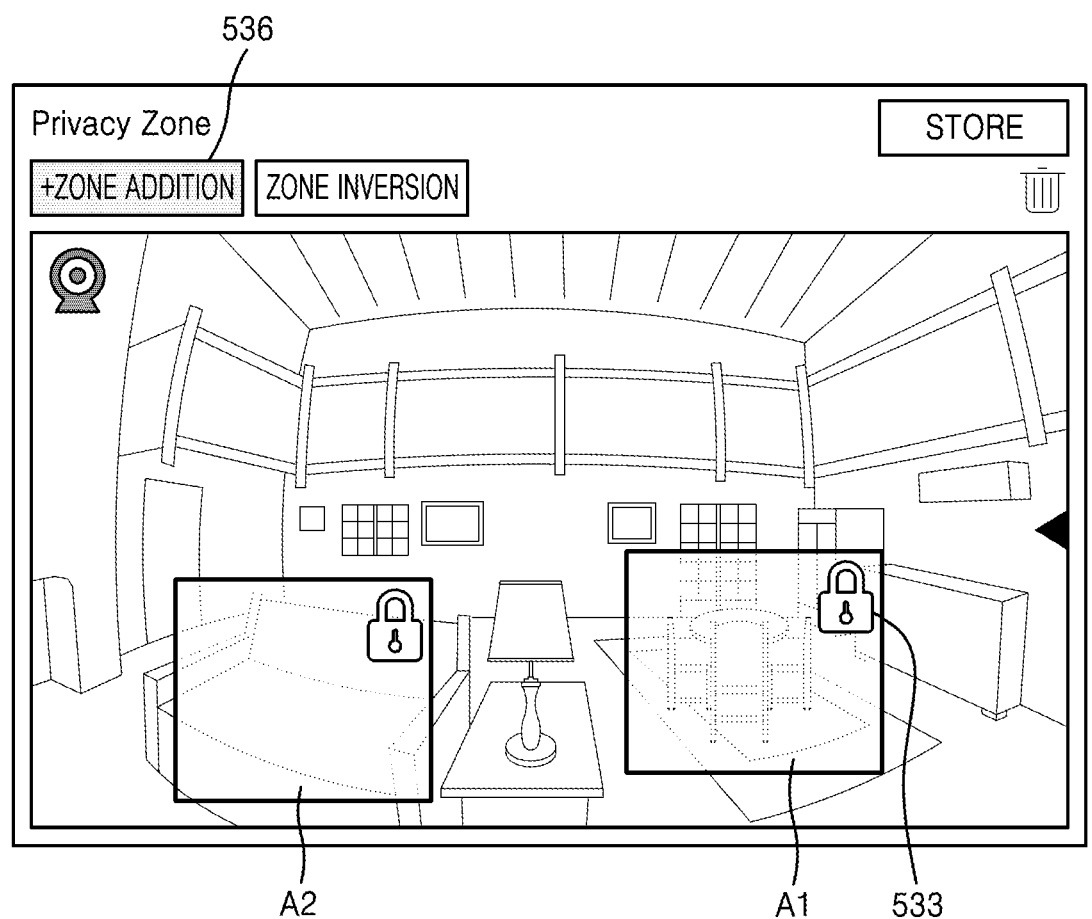

Referring to FIG. 7C, when the user selects a zone addition 536, the image processing device may additionally display the zone designation block 532 and a user may move the zone designation block 532 to additionally designate a privacy zone. The user may designate one or more privacy zones by selecting the zone addition 536 by a predetermined number of times. The image processing device may limit the number of privacy zones per person.

Figure 7D:
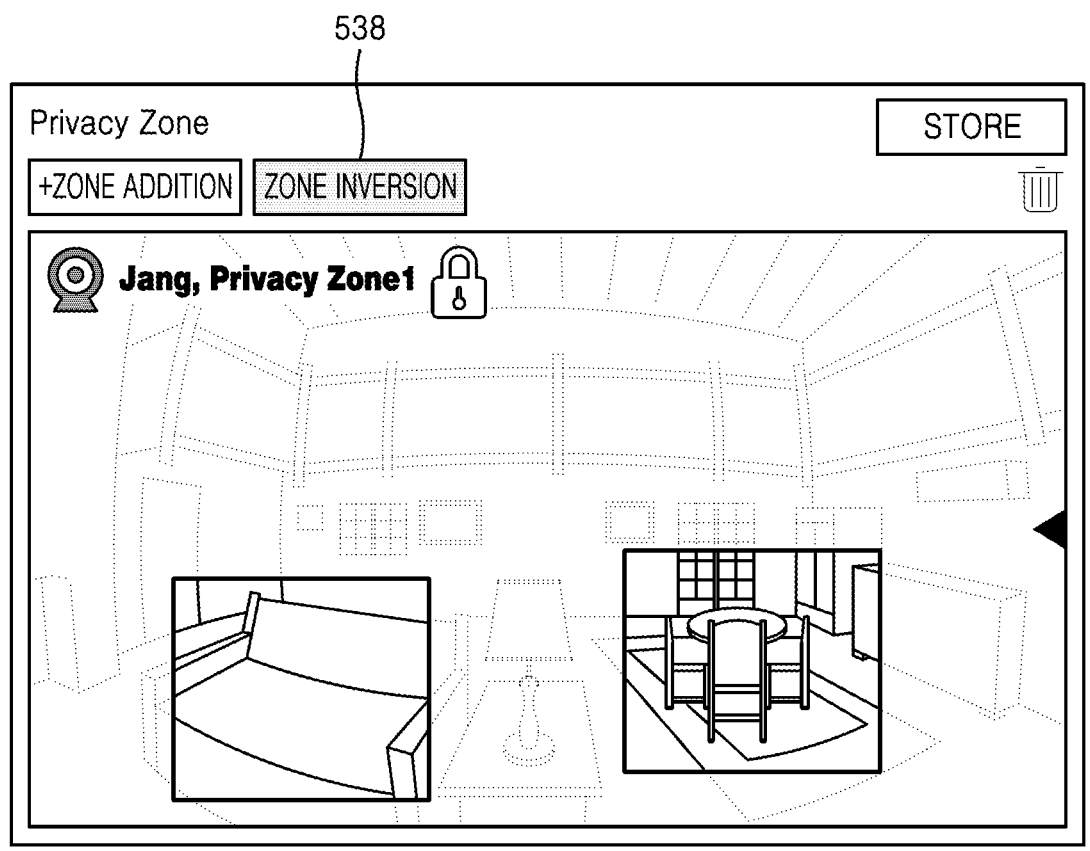

Referring to FIG. 7D, when the user selects a zone inversion 538, a zone outside a zone surrounded by the zone designation block 532 may be designated as a privacy zone. A zone inversion function may be useful when a range of the privacy zone is wide.

The image processing device may set a privacy mode of the user to the second mode in which only the designated zone is set as the privacy zone when zone setting is completed. In the second mode, a specific zone in which the user does not want to be disturbed by privacy invasion of an individual may be previously designated, and thus an event occurring in a corresponding space may not be exposed to others but may be recorded only in an account of the user.

Figure 7E:
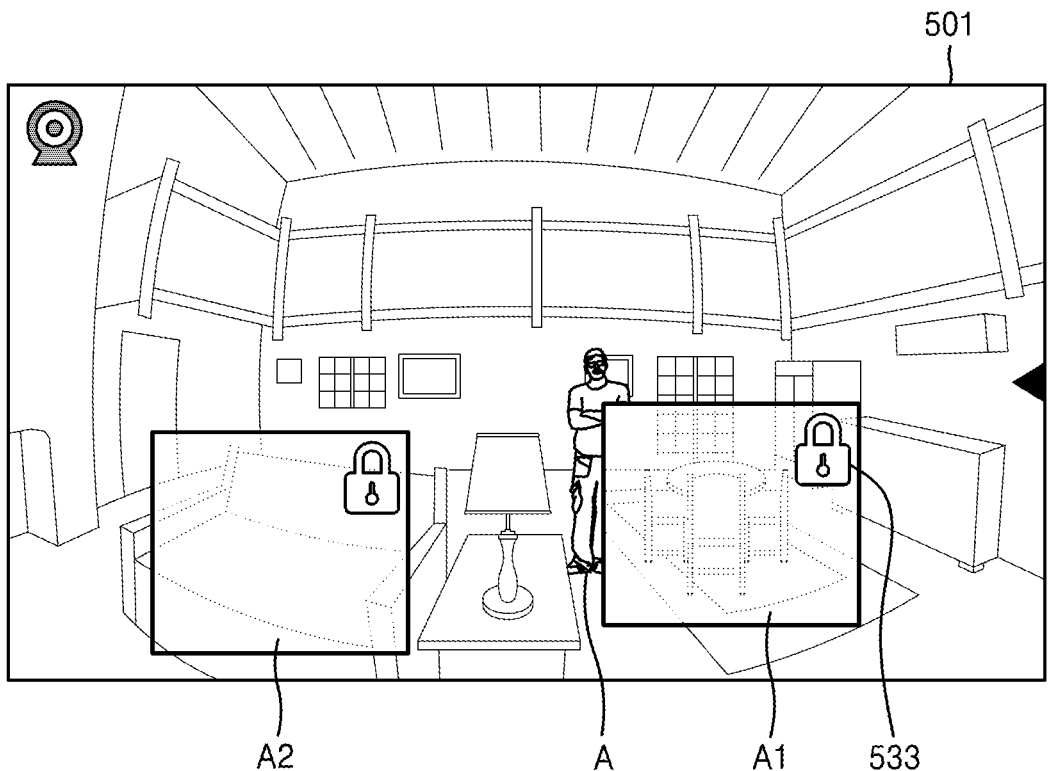

FIG. 7E illustrates an example of a user terminal screen of another user other than a user A while the user A is in a privacy mode. Referring to FIG. 7E, when the image processing device receives an image request from the other user, the image processing device may provide an image obtained by blind processing on privacy zones A1 and A2 on which the lock mark 533 is indicated to a user terminal of the other user. Accordingly, the other user may recognize that the privacy mode of the user A is being executed. The privacy zone is still imaged and does not expose an event that occurs to others in the corresponding zone.

When the user A is located in the privacy zones A1 and A2 set by the user A, at least a part of the user A is not displayed on a screen of the other user by blind processing in an overlapping portion of the user A and the privacy zones A1 and A2. Accordingly, the other user may not know what the user A is doing in the privacy zones A1 and A2, and thus privacy of the user A may be protected.

Figure 7F:
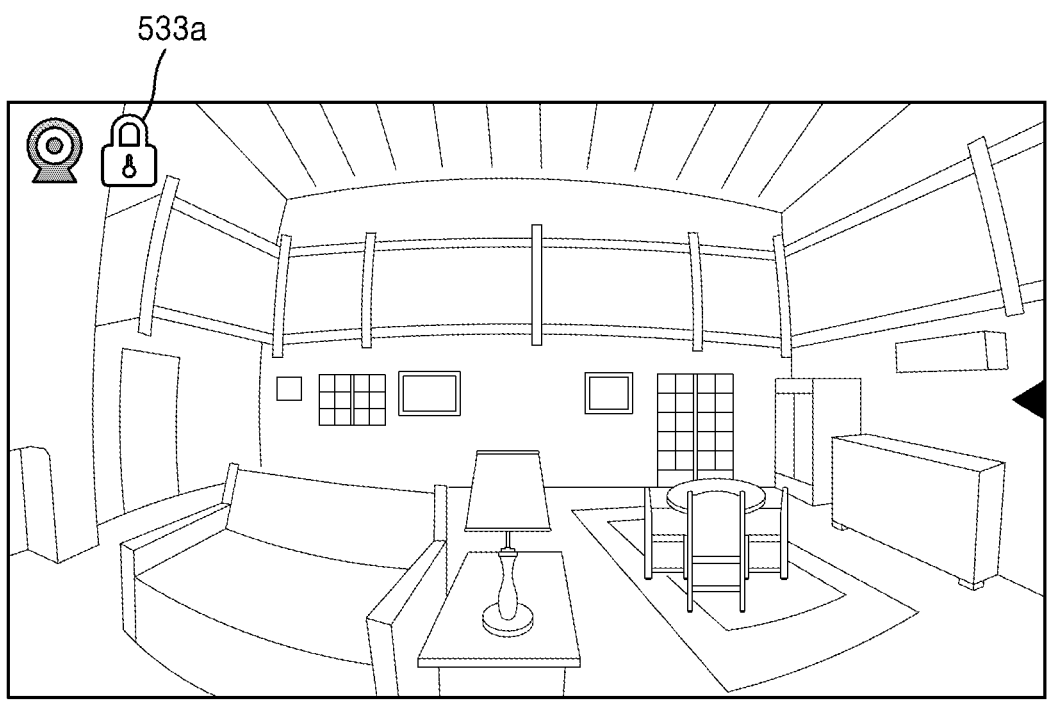

FIG. 7F illustrates an example of a user terminal screen of the user A during an execution of a privacy mode of the user A. Referring to FIG. 7F, when receiving an image request from the user A, the image processing device may provide an original image to a user terminal of the user A. The image processing device may provide a lock mark 533a to one side of the screen to indicate that a privacy function set by the user A is being performed, thereby providing the user A with psychological sense of stability.

Figure 8:
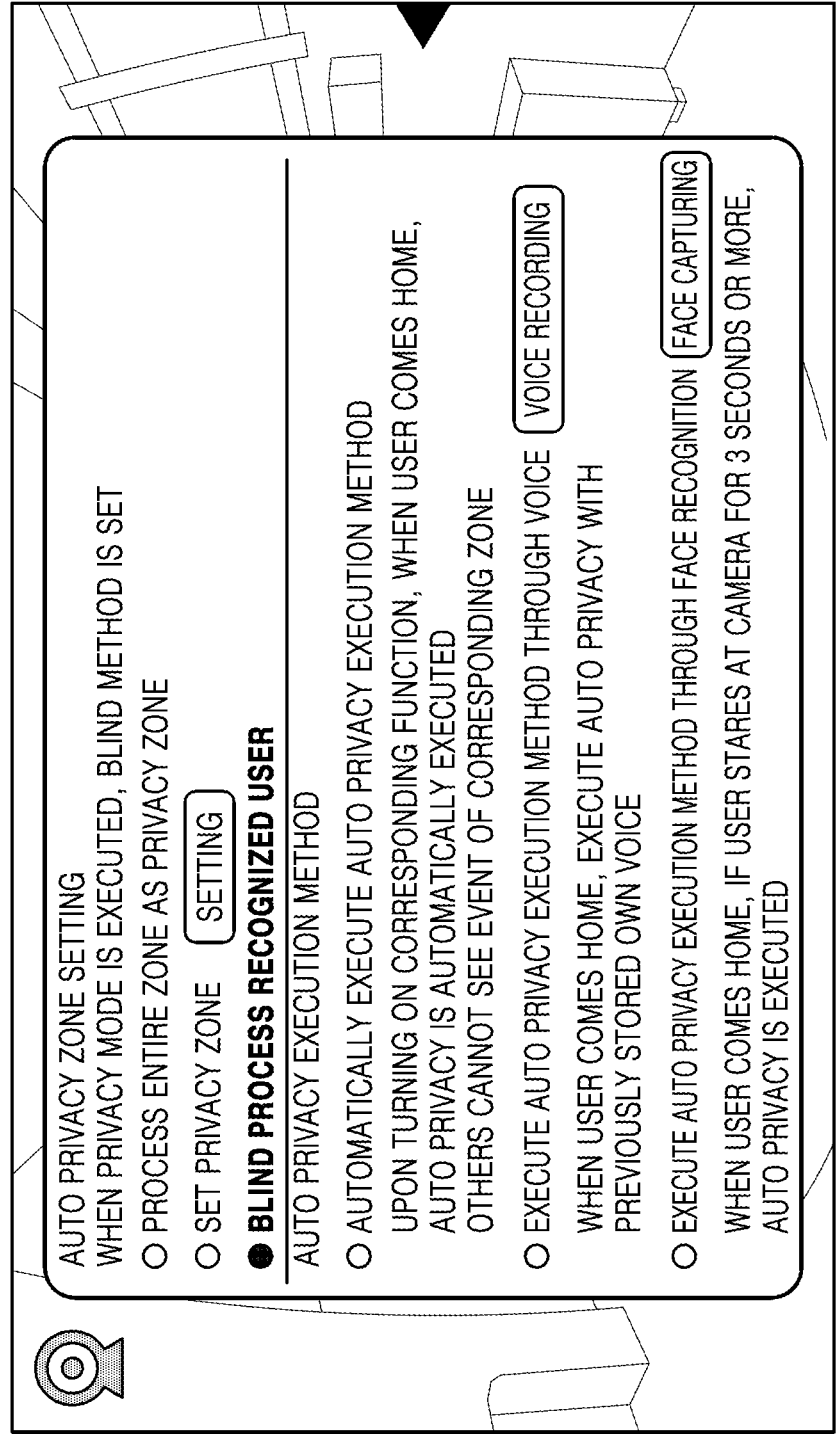
Figure 9A:
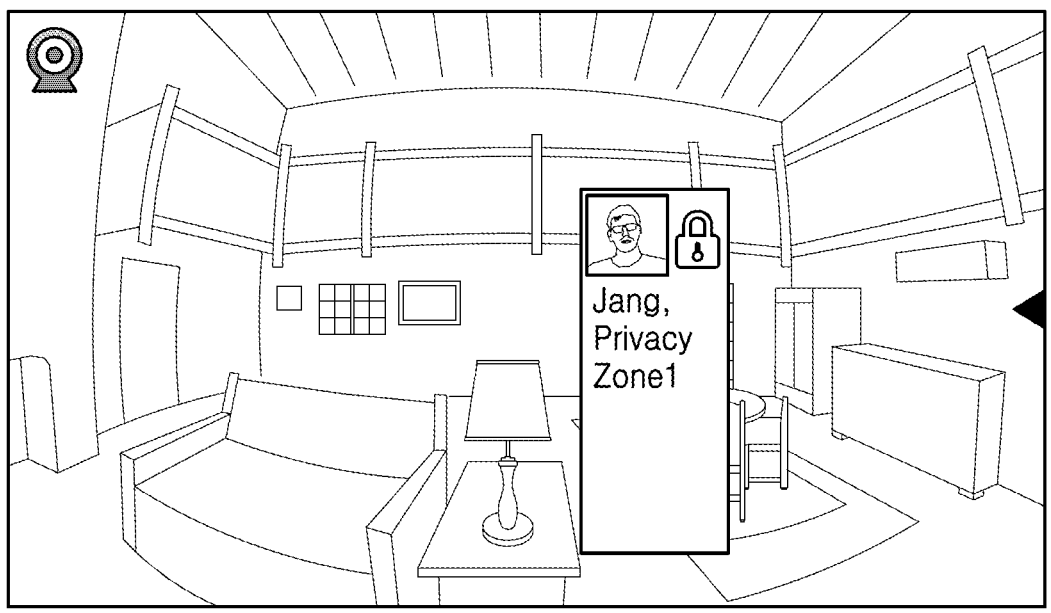
Figure 9B:
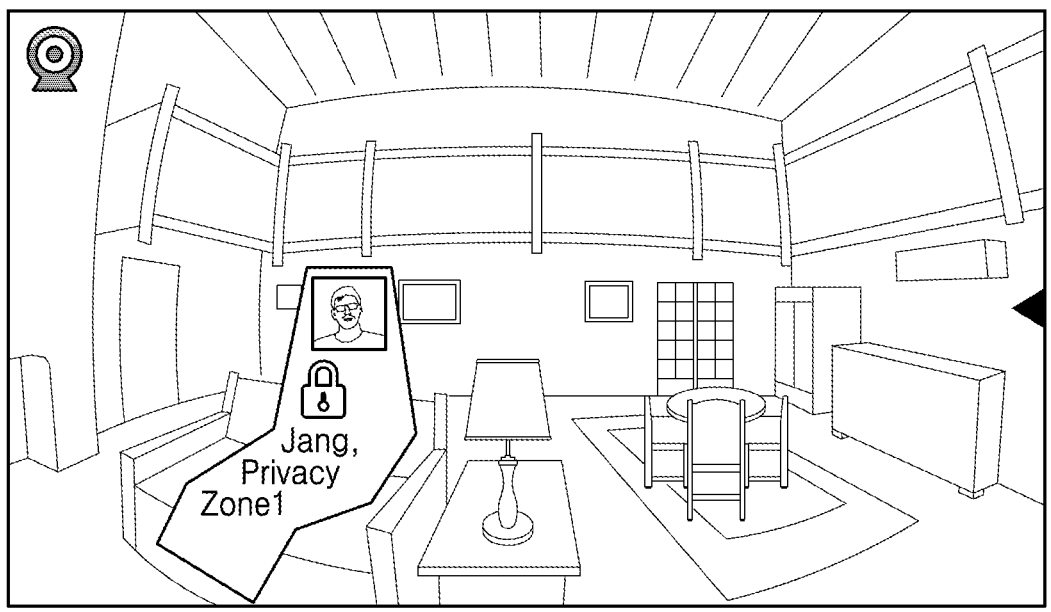

FIG. 8 illustrates an example in which a user selects a third mode in the setting window 510. FIGS. 9A and 9B illustrate examples of a privacy zone according to the third mode.

As shown in FIG. 8, when the user selects the third mode, the image processing device may provide a user terminal with an image obtained by blind processing on the user as the privacy zone as shown in FIGS. 9A and 9B. The privacy zone in the third mode may be represented by a figure including at least a contour of the user, and a position, a size, and a shape thereof may be changed according to a movement and a posture of the user. For example, the user may be blind processed according to the movement of the user alone in the house. The privacy zone of the user may be provided with information (e.g., an ID or a thumbnail) of the blind-processed user such that another user is able to identify and may display the lock mark 533 and zone identification information (e.g., privacy zone #) in the form of text.

The image processing device may receive a selection of the third mode and set the privacy mode of the user to the third mode in which the user is the privacy zone.

Figure 10:
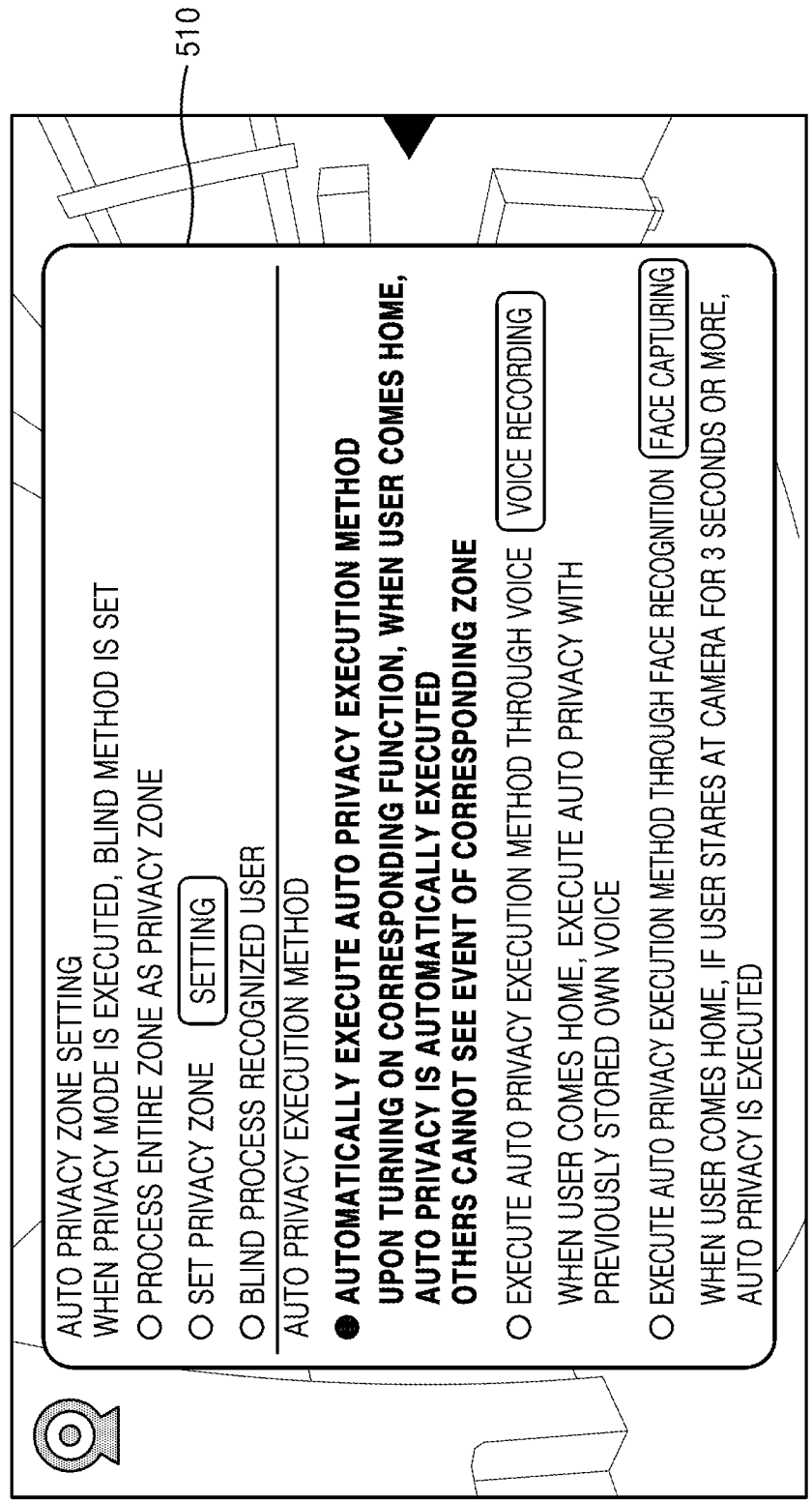

FIG. 10 illustrates an example in which a user selects an automatic execution in the setting window 510.

When receiving an automatic execution selection of the user, the image processing device may be changed to a privacy mode set by the user when the user who selects the automatic execution appears in a monitoring zone. The image processing device may detect the user by detecting features of a motion of the user, a gesture, a voice, a face, and the like. The image processing device may be automatically changed to the privacy mode when a corresponding user appears in a zone designated for each user.

Figure 11:
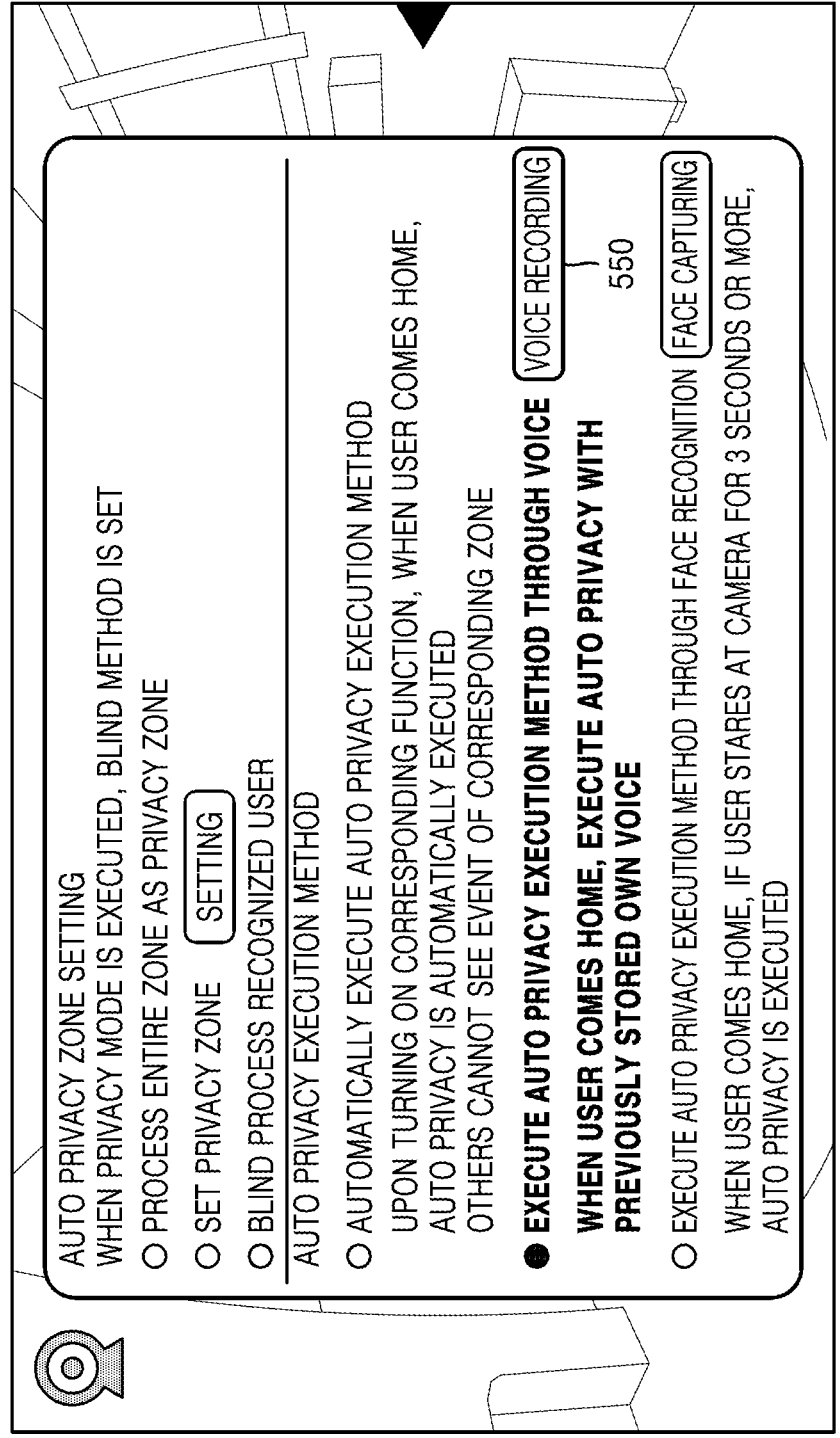
Figure 12A:
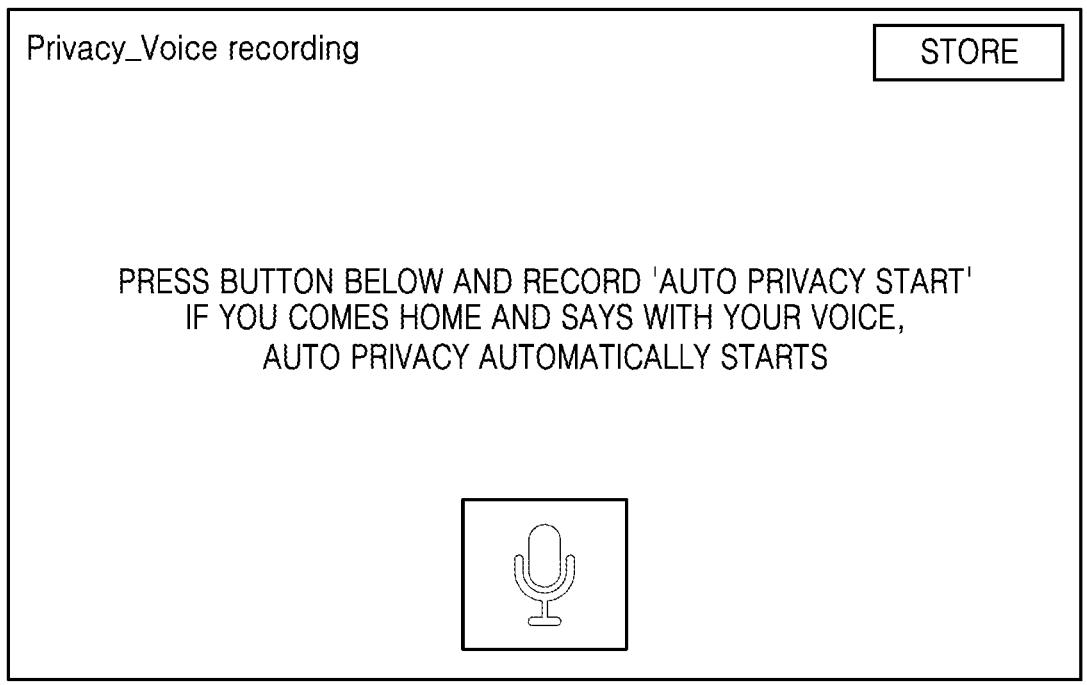
Figure 12B:
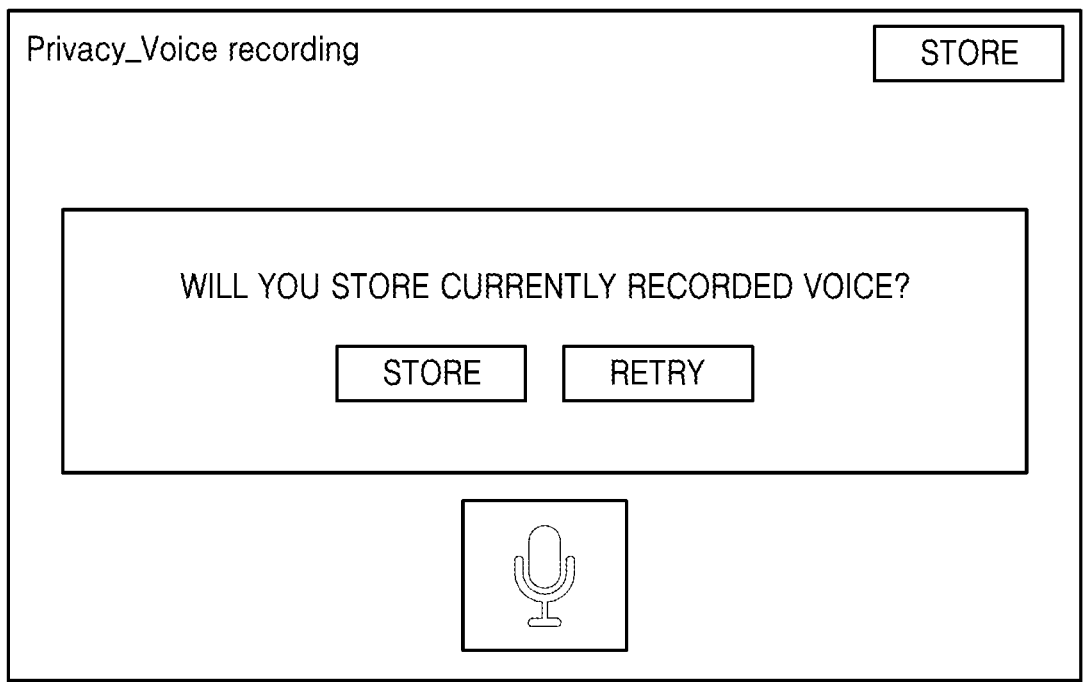

FIGS. 11 to 12B illustrate examples in which the user selects a voice recognition execution in the setting window 510.

Referring to FIG. 11, when the user selects the voice recognition execution, a voice recording icon 550 may be activated. Referring to FIGS. 12A and 12B, when the user selects the voice recording icon 550, the image processing device may record and record a user's voice of a specific word or phrase. When the user selects the voice recognition execution, the image processing device may be changed to a privacy mode set by the user only when a voice of the same word or phrase as the recorded word or phrase is recognized even though the user is detected in a monitoring zone. When the user pronounces the same word or phrase as the recorded word or phrase in the monitoring zone, the image processing device may determine whether the user is the same user through a comparison with the stored voice. When the user is recognized as the same user, the image processing device may be changed to the privacy mode set by the user.

Figure 13:
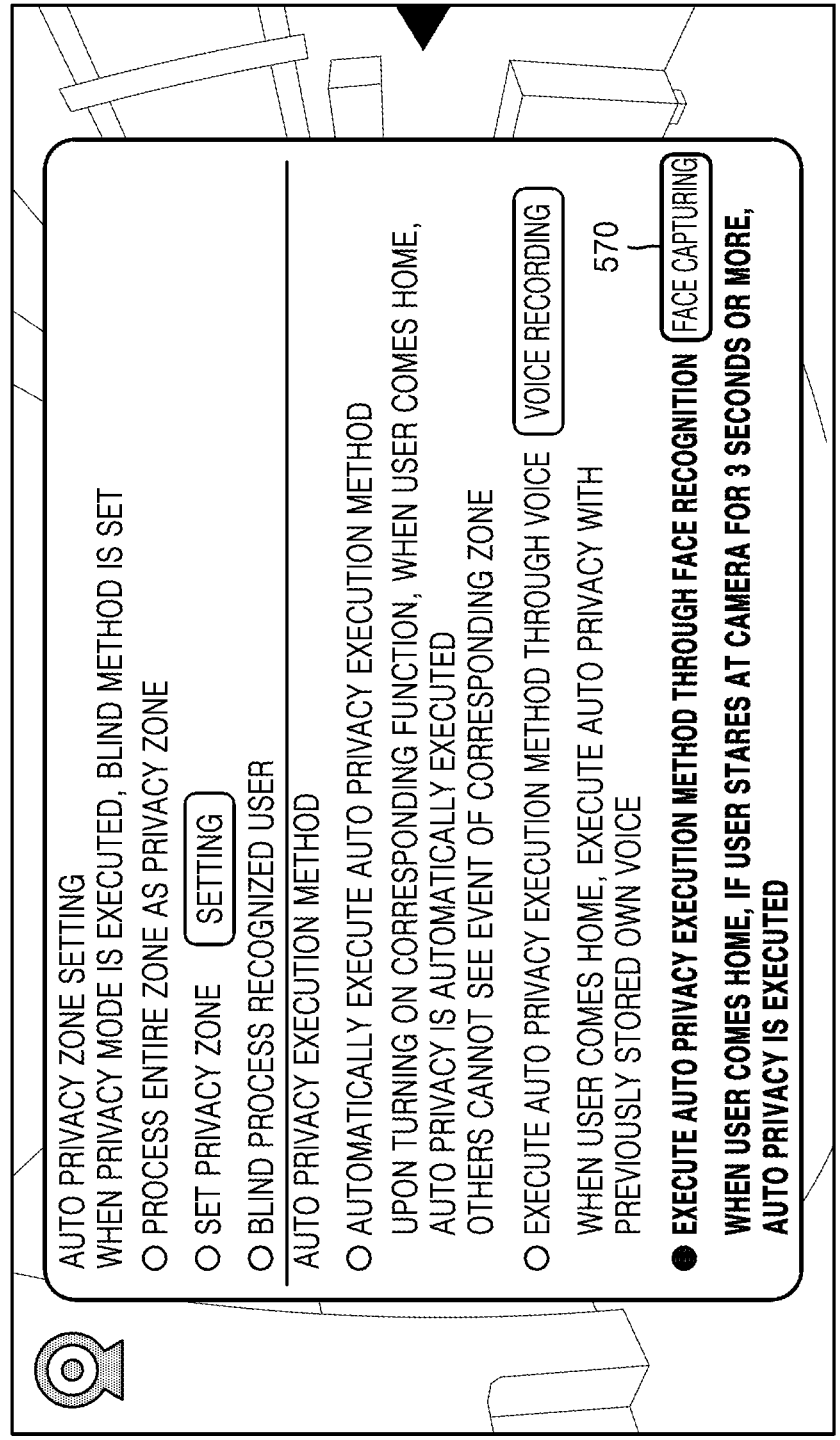
Figure 14A:
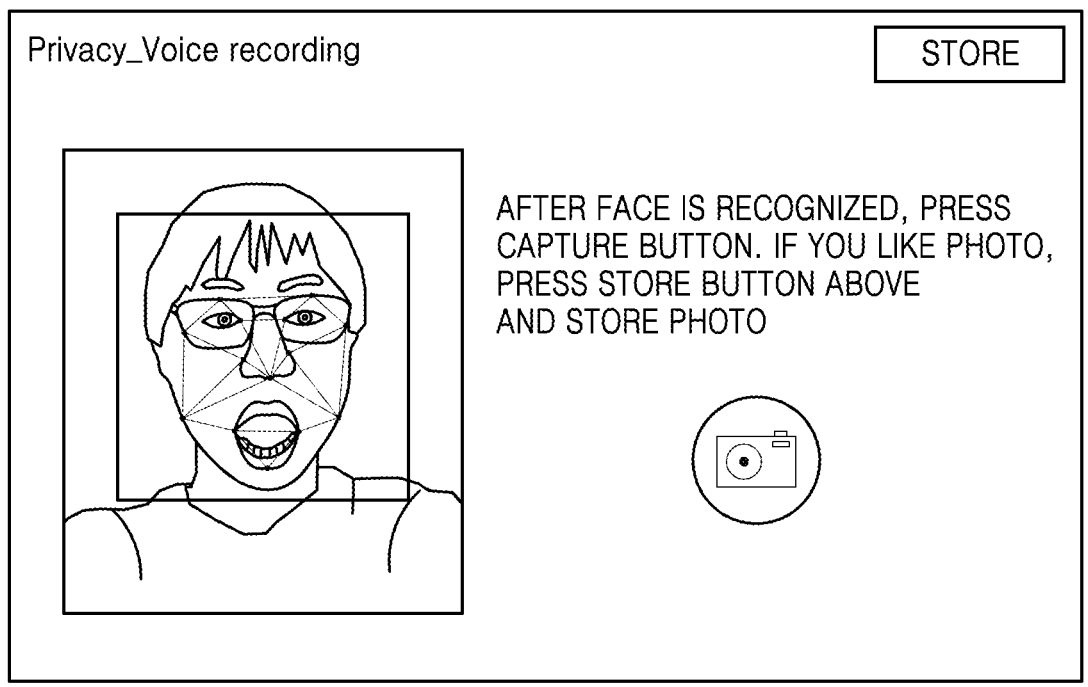
Figure 14B:
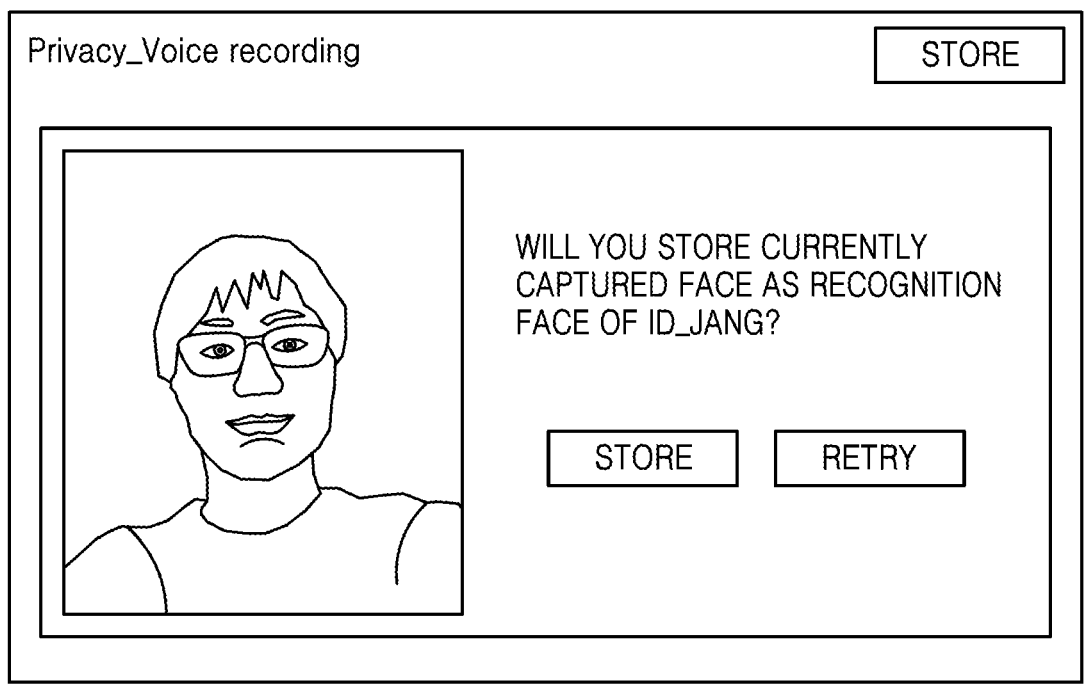

FIGS. 13 to 14B illustrate examples in which the user selects a face recognition execution in the setting window 510.

Referring to FIG. 13, when the user selects the face recognition execution, a face capture icon 570 may be activated. Referring to FIGS. 14A and 14B, when the user selects the face capture icon 570, the image processing device may capture and store a face of the user. When the user selects the face recognition execution, the image processing device may be changed to a privacy mode set by the user only when a face matching the captured face stares at a camera for a predetermined period of time even though the user is detected in a monitoring zone. When the user stares at the camera for the predetermined period of time in the monitoring zone, the image processing device may determine whether the user is the same user through a comparison with the stored face. When the user is recognized as the same user, the image processing device may be changed to the privacy mode set by the user.

Figure 15:
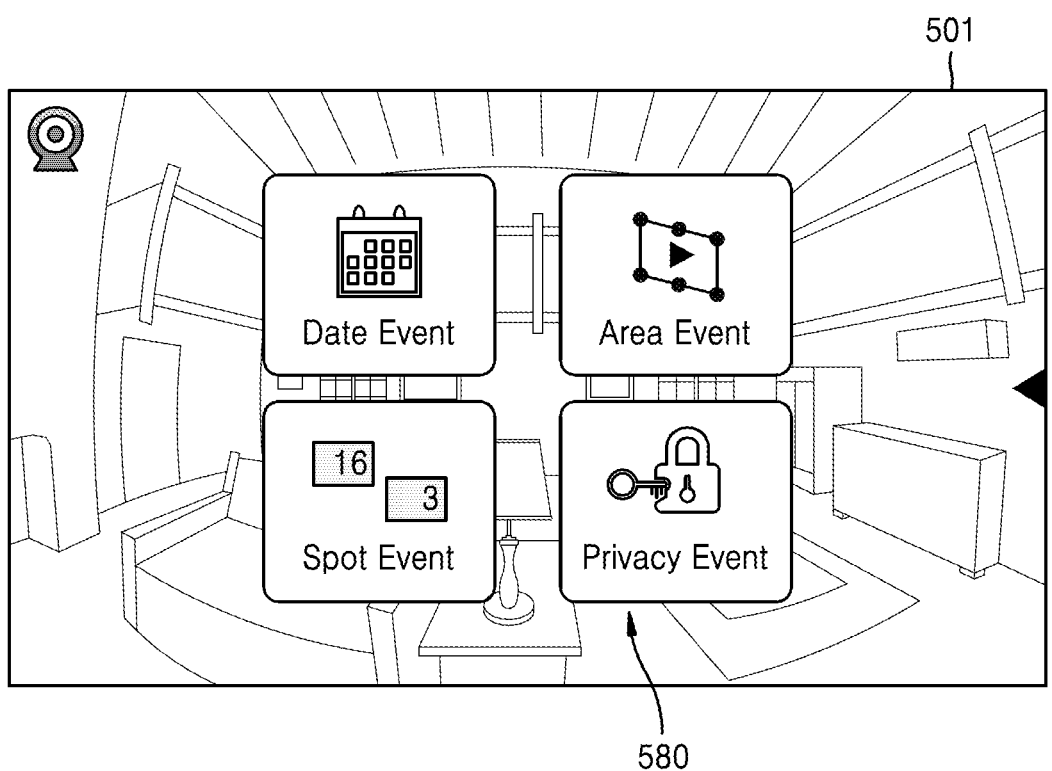
Figure 16:
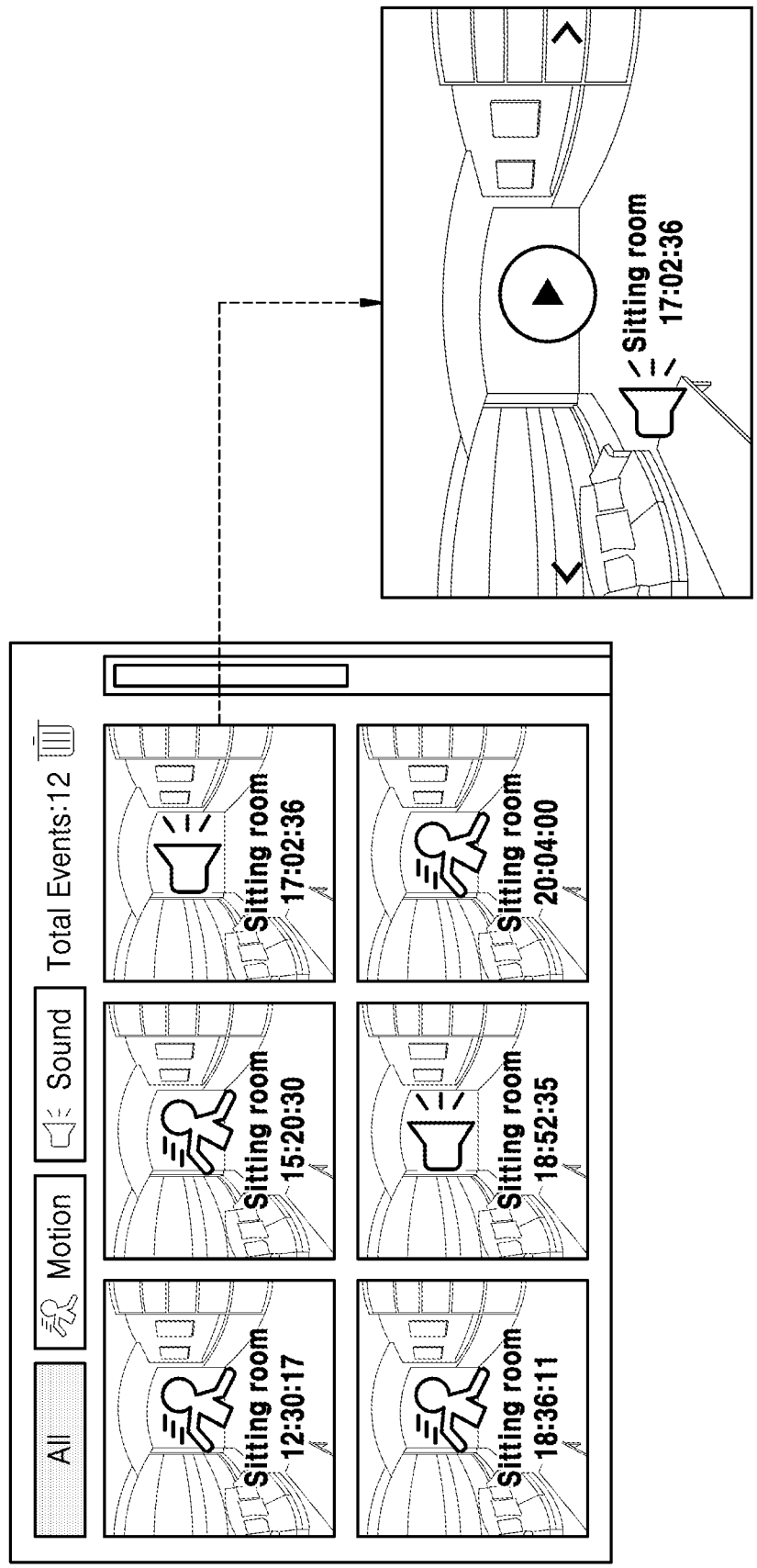

FIGS. 15 and 16 illustrate examples of a method, performed by an image processing device, of providing an event to a terminal according to an embodiment of the present disclosure.

Referring to FIG. 15, when the user selects an event menu among the menus 507 of the wheel key 505 shown in FIG. 4, the image processing device may provide at least one event group 580 to the screen 501. The event group 580 may overlap an image displayed on the screen 501.

The user may select an event group to be viewed from the event group 580. The event group may include an event by date, an event by area, an event by spot, and a privacy event. The privacy event is an event that occurs in a privacy zone while a privacy mode of the user is being performed. The privacy event may be viewed only by the user of the corresponding privacy mode. The user may view the privacy event through authentication of an account (an ID and a password) or biometric information of the user.

Referring to FIG. 16, the image processing device may classify and provide privacy events into all, motion, sound, and the like to the user who is successfully authenticated. Each event may be provided as a thumbnail. Event information may be overlapped with the thumbnail and displayed as text. When the user selects the thumbnail, event data associated with the selected thumbnail may be reproduced.

Figure 17:
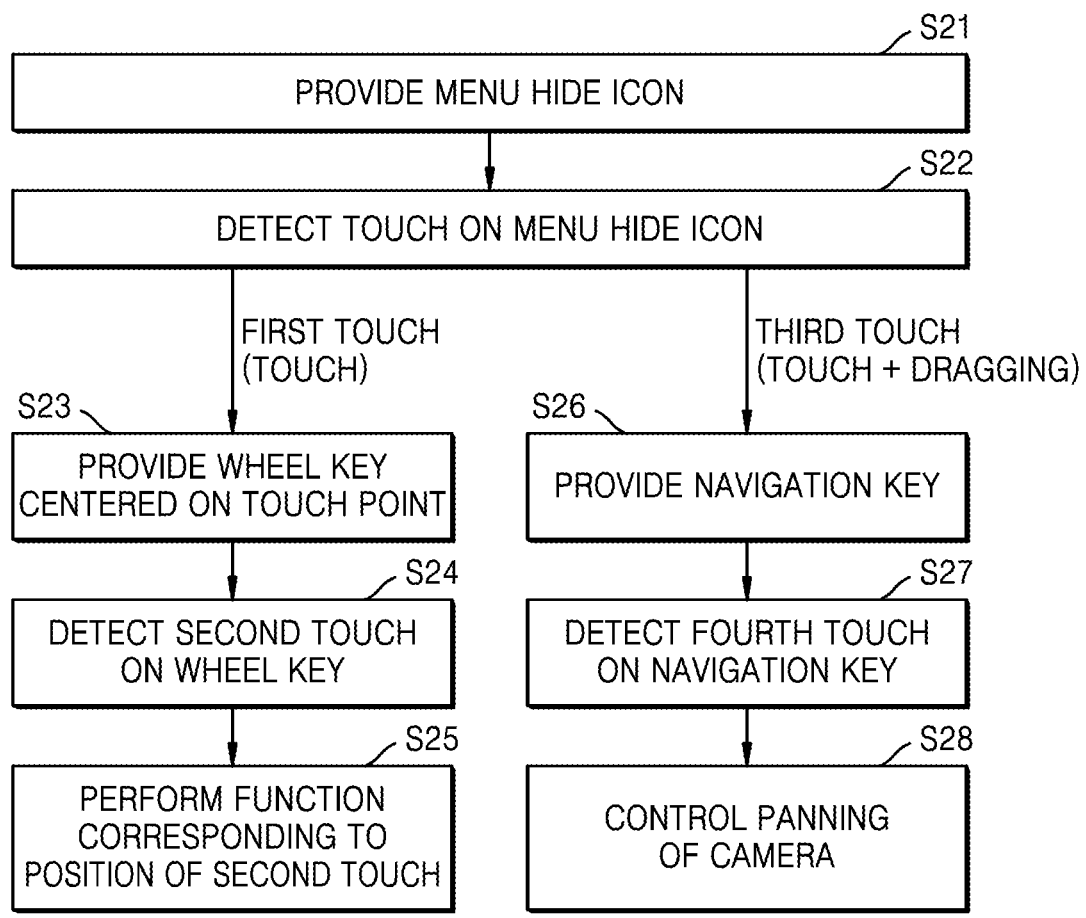
FIG. 17 is a flowchart illustrating a menu execution method provided by an image processing device to a user terminal according to an embodiment of the present disclosure.

FIG. 17 is a flowchart illustrating a menu execution method provided by an image processing device to a user terminal according to an embodiment of the present disclosure. Hereinafter, detailed descriptions of parts that are redundant with those described above will be omitted.

The user terminal may execute a monitoring application to access the image processing device, and the image processing device may provide an image obtained by capturing a monitoring zone and a menu hide icon (S21). The user terminal may provide a live view image, and the user terminal may be provided with the menu hide icon in a triangular or semicircular shape.

The image processing device may detect a touch on the menu hide icon (S22).

When the detected touch is a first touch that is a first touch of the menu hide icon, the image processing device may provide a wheel key centered on the touch point (S23). At least one menu item may be arranged on the wheel key at a predetermined space. The menu item may include a privacy menu Auto Privacy for performing a privacy function, a menu Event for viewing an event, and a menu Playback for playing back a stored image. The user may easily enter the menu without going through a complex depth by selecting the menu of the wheel key.

When the image processing device detects a second touch on the wheel key (S24), the image processing device may perform a menu function corresponding to a position of the second touch (S25).

When the position of the second touch is the privacy menu, the image processing device may receive privacy information including a change condition to a privacy mode and setting of a privacy zone, match the privacy information to the user who inputs the second touch, and set the privacy mode for each user.

The image processing device may provide at least one event group when the position of the second touch is an event view menu. The event group may include a group of privacy events that are events occurring in the privacy zone during the privacy mode. When receiving a privacy event request, the image processing device may provide the privacy event to the user terminal when a user requesting the privacy event is authenticated as the user of the executed privacy mode.

When the position of the second touch is the playback menu, the image processing device may provide a window in which a playback condition (a time, a zone, etc.) may be set on a screen. The image processing device may search for an image corresponding to the playback condition in stored images and, be changed from a live view mode to a playback mode to provide the found image to the user terminal.

The image processing device may provide a navigation key controlling panning of a camera (S26) when the detected touch on the menu hide icon is a third touch, which is a combination of the touch of the menu hide icon and dragging on the screen. When the user pulls the menu hide icon with his/her finger, a navigation key may be displayed on a position of the menu hide icon. The user may change a position and size of the navigation key.

When the image processing device detects a fourth touch on the navigation key (S26), the image processing device may control panning of the camera in response to the fourth touch (S28). The fourth touch may be a first touch of a predetermined position on the navigation key away from a reference position of the navigation key, or a combination of touching and dragging from the reference position to a predetermined position on the navigation key. The user may designate a plurality of privacy zones at different positions by moving a camera view using the navigation key.

Figure 18:
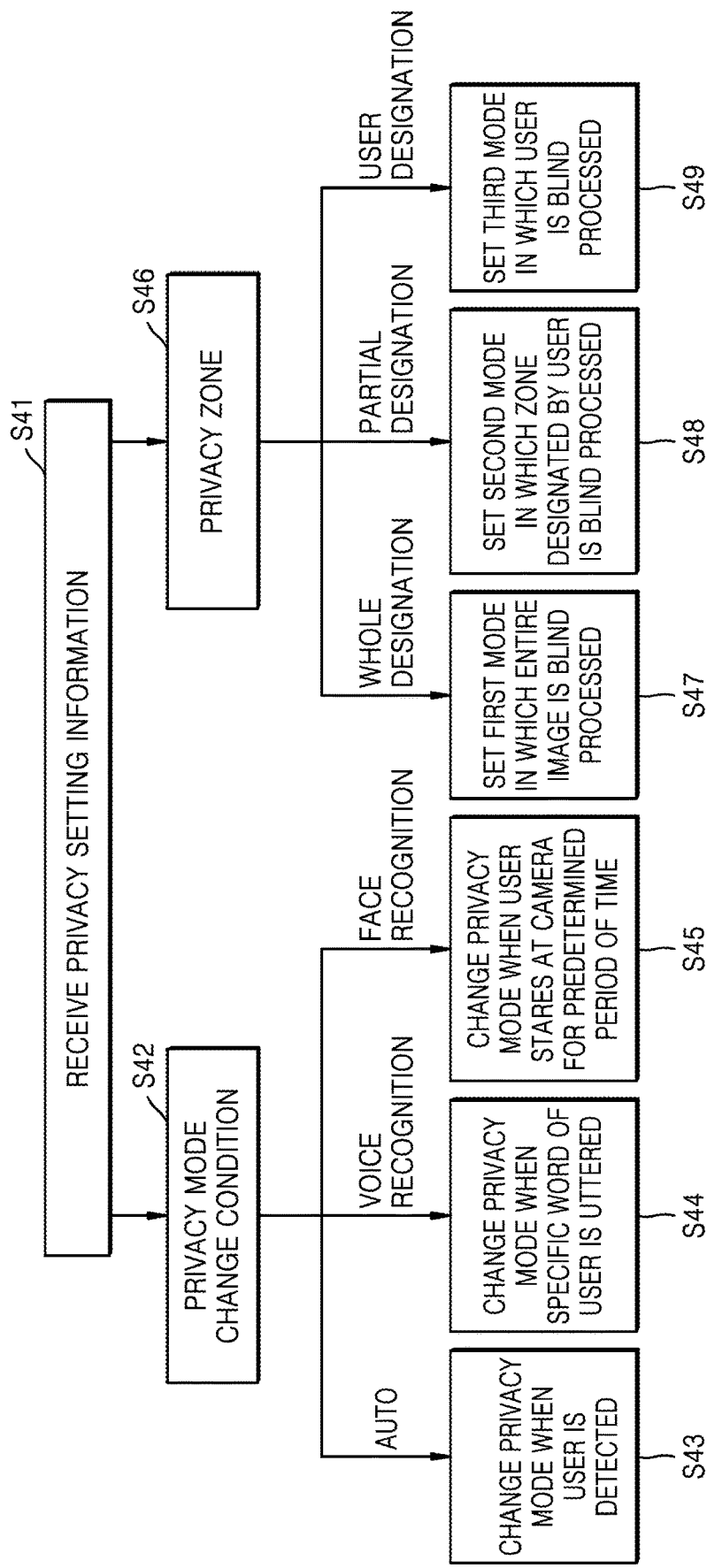
FIG. 18 is a flowchart illustrating a privacy function setting method performed by an image processing device according to an embodiment of the present disclosure.

FIG. 18 is a flowchart illustrating a privacy function setting method performed by an image processing device according to an embodiment of the present disclosure.

Referring to FIG. 18, the image processing device may receive privacy setting information from a user terminal (S41). The privacy setting information may include setting information of at least one of a privacy mode change condition and a privacy zone.

The image processing device may determine the privacy mode change condition (S42).

In the case where the privacy mode change condition is an automatic execution, when a user is detected in a monitoring zone, the image processing device may be set to be automatically changed to a privacy mode (S43).

In the case where the privacy mode change condition is a voice recognition execution, when an utterance of the user such as a designated word or phrase is recognized, the image processing device may be set to be changed to the privacy mode (S44). In the case of the voice recognition execution, even though the user is already detected, the image processing device is not changed to the privacy mode until the utterance of the designated word or the like is recognized.

In the case where the privacy mode change condition is a face recognition execution, when it is recognized that the user stares at a camera for a predetermined period of time, the image processing device may be set to be changed to the privacy mode (S45). In the case of the face recognition execution, even though the user has already been detected, the image processing device is not changed to the privacy mode until a face of the user is recognized in a stop state for a predetermined period of time.

The image processing device may determine a privacy zone setting (S46).

In the case of a whole designation of setting an entire image as the privacy zone, the image processing device may set the privacy mode to a first mode in which the entire image is blind processed (S47).

In the case of a partial designation of setting a part of the image as the privacy zone, the image processing device may set the privacy mode to a second mode in which at least one zone set by the user is blind processed (S48).

In the case of a user designation of designating the user as the privacy zone, the image processing device may set the privacy mode to a third mode in which the user is blind processed (S49).

The image processing device may manage a privacy function for each user by matching the privacy mode change and the privacy mode to the user.

Figure 19:
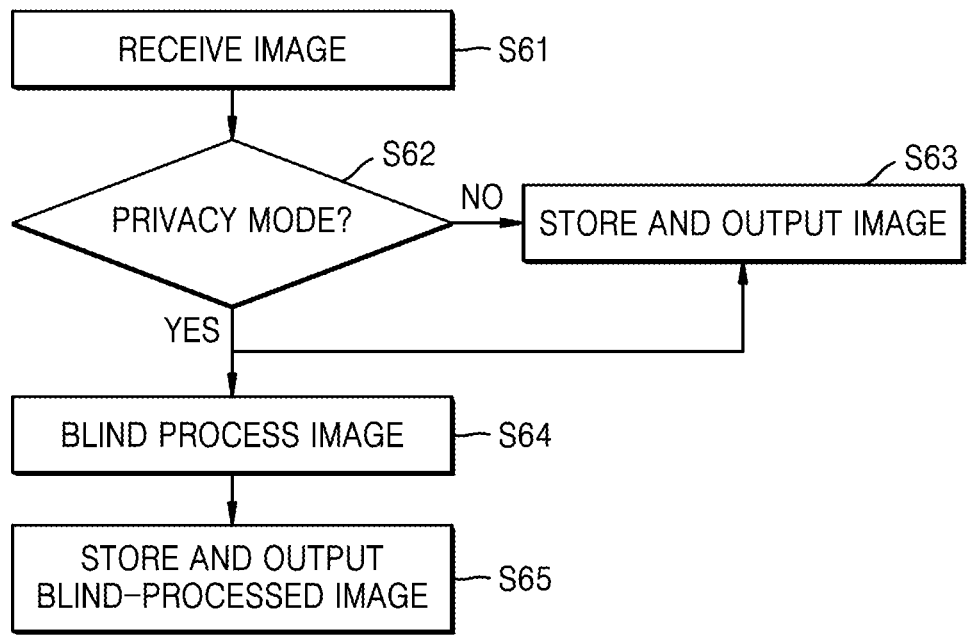
FIG. 19 is a flowchart illustrating a privacy mode execution method performed by an image processing device according to an embodiment of the present disclosure.

FIG. 19 is a flowchart illustrating a privacy mode execution method performed by an image processing device according to an embodiment of the present disclosure.

Referring to FIG. 19, when the image processing device receives an image (S61), the image processing device may determine whether a current mode is a normal mode or a privacy mode (S62).

The image processing device may store and output an image in the normal mode (S63).

In the privacy mode, the image processing device may store the image (S63), simultaneously blind process a privacy zone designated in the image (S64), and store and output the blind-processed image (S65). The privacy zone may be one of an entire image, a part of the image designated by the user, or the user himself.

Figure 20:
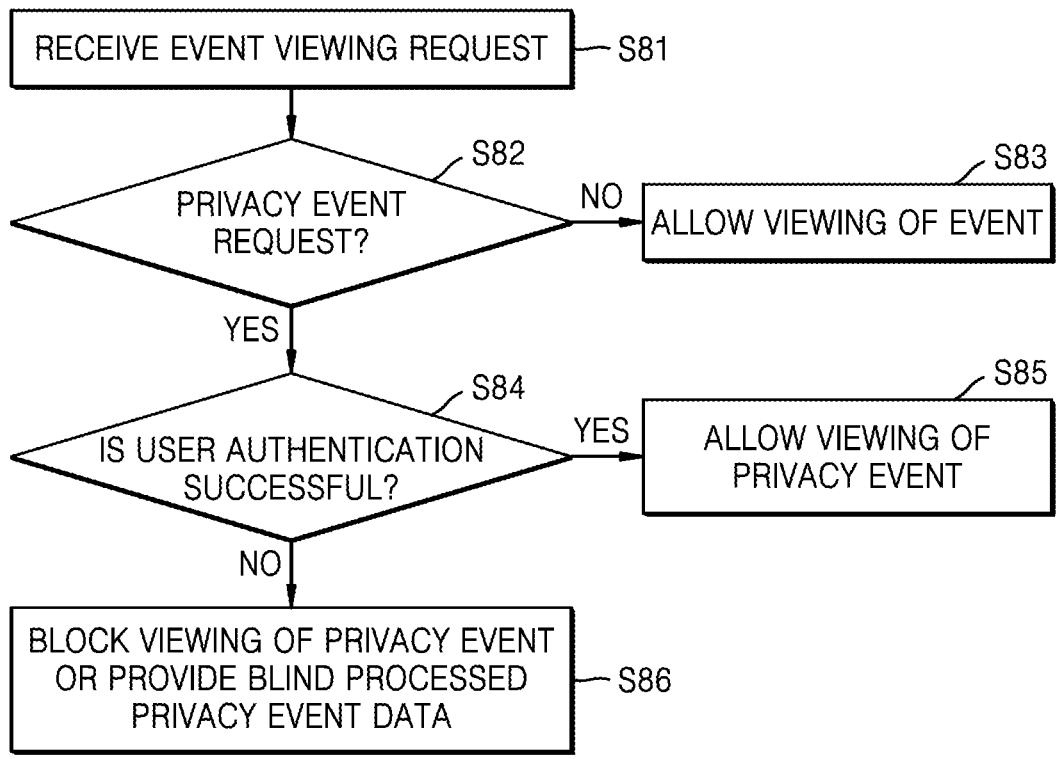
FIG. 20 is a flowchart illustrating an event viewing method according to an embodiment of the present disclosure.

FIG. 20 is a flowchart illustrating an event viewing method according to an embodiment of the present disclosure.

Referring to FIG. 20, when an image processing device receives an event viewing request from a user terminal (S81), the image processing device may determine whether a viewing request is a general event request or a privacy event request (S82).

When the viewing request is a general event request, the image processing device may allow viewing of the event (S83). The image processing device may provide event data to the user terminal.

When the viewing request is a privacy event request, the image processing device may perform user authentication (S84).

When the user authentication is successful, the image processing device may allow viewing of the privacy event (S85). Privacy event data from which blind processing is removed or reconstructed may be provided.

When the user authentication fails, the image processing device may block viewing of the privacy event or provide blind-processed privacy event data (S86).

Although not shown, the image processing device of the present disclosure may provide a guidance UI when a user selects a menu or a function and may not provide the guidance UI after the user selects 'no replay'. The guidance UI is a UI that displays a separate popup when the user selects the menu and provides the user with information about how to use and an image such that the user may easily understand the menu.

A privacy function according to embodiments of the present disclosure may be applied to a home security mobile app APP, a user interface UX/UI to be used for a mobile app APP linked to a home security camera (a panning camera or pan & tilt camera) of a B2C field, a device tablet, a smart phone, software SW of a computing device (PC) linked with a camera on which the app APP is executed, and the like. The privacy function applied to home security is activated when all family members are not at home and an individual is alone in the house. According to the privacy function of the present disclosure, because the user is always monitored by keeping the camera on, the user may be relieved. An event may be left to only a user's own account, thereby providing usability capable of satisfying both a privacy invasion and a security problem without being one-sided.

The privacy function according to the embodiments of the present disclosure may prevent the user from an extreme selection without having to turn off the camera or turn a direction of the camera artificially and solve both problems of security and privacy invasion such that the user may use the privacy function in the most suitable environment to the camera installation purpose.

The privacy function according to the embodiments of the present disclosure may solve a problem in that when an individual is at home with respect to all the members connected to the camera, the camera installation is not easy because the individual hates the feeling of watching himself/ herself or watching the rest and privacy of the individual, thereby drastically reducing animosity to installation of the security camera.

The privacy function according to the embodiments of the present disclosure may have unique IDs for individual members such that privacy zones may be easily set and used individually for the corresponding IDs, thereby increasing privacy respect of each member and user convenience. Also, the privacy function according to the embodiments of the present disclosure may be simple and easy to set up, and once set, it is not necessary to continuously set separate settings, thereby reducing inconveniences and enjoying continuous convenience.

The image processing and image providing methods according to the embodiments may be embodied as computer-readable code on a non-transitory computer-readable recording medium. The non-transitory computer-readable recording medium may be any recording medium that may store data which is thereafter readable by a computer system. Examples of the non-transitory computer-readable recording medium include read-only memory (ROM), random-access memory (RAM), CD-ROMs, magnetic tapes, floppy disks, and optical data storage devices. The computer-readable recording medium may also be distributed over network-coupled computer systems so that the computer-readable code is stored and executed in a distributed fashion. Also, functional programs, code, and code segments for implementing the present disclosure may be easily construed by programmers skilled in the pertinent art.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

The invention claimed is:

1. An image providing method comprising:
   storing a plurality of privacy modes of a plurality of registered objects by setting a privacy mode of each of the plurality of registered objects;
   obtaining a first image of a monitoring zone from a camera;
   setting a first privacy mode of a first registered object first appearing in the monitoring zone among the plurality of privacy modes of the plurality of registered objects; and
   in the first privacy mode, in response to a request for the first image from at least one of the plurality of registered objects other than the first registered object, generating a second image in which a privacy zone preset by the first registered object is processed in the first image.

2. The image providing method of claim 1, wherein the privacy zone comprises one of an entirety of the first image, a part of the first image, and the first registered object.

3. The image providing method of claim 1, wherein at least one of a size, a shape, and a position of the privacy zone is changed in the first image.

4. The image providing method of claim 1, wherein the setting the first privacy mode comprises: in the first image, when one of a detection of the first registered object, a voice recognition of the first registered object, and a face recognition of the first registered object preset by the first registered object is satisfied, setting the first privacy mode set by the first registered object.

5. The image providing method of claim 1, further comprising:
   detecting a first touch of a mark indicating a menu hide status provided on a screen from a terminal of at least one of the plurality of registered objects and providing a wheel key in which at least one menu centered on a position of the first touch is displayed to the screen; and
   detecting a second touch on the wheel key and performing a function of a menu corresponding to a position of the second touch.

6. The image providing method of claim 5, wherein the performing of the function of the menu comprises:
   when the menu corresponding to the position of the second touch is a privacy setting, receiving privacy information comprising a change condition to a privacy mode and a setting of the privacy zone; and
   matching the privacy information with an object that inputs the first and second touch.

7. The image providing method of claim 6, wherein the receiving of the privacy information comprises:
   providing a block overlapped with the first image for zone designation; and
   receiving an input to designate a zone surrounded by the block or a zone other than the zone surrounded by the block in the first image as the privacy zone.

8. The image providing method of claim 5, wherein the performing of the function of the menu comprises:
   when the menu corresponding to the position of the second touch is an event viewing, requesting authentication of an object requesting a privacy event which is an event occurring in the privacy zone upon receiving a request for the privacy event; and
   allowing viewing of the privacy event when the object requesting the privacy event is authenticated as the first registered object.

9. The image providing method of claim 1, further comprising:
   detecting a third touch of a mark indicating a menu hide status provided on a screen from a terminal of at least one of the plurality of registered objects and providing a navigation key overlapped with the first image in response to the third touch; and
   detecting a fourth touch of the navigation key and controlling a view of the camera with a coordinate value corresponding to the fourth touch.

10. An image processing device comprising:
    a memory configured to store a plurality of privacy modes that are respectively set by a plurality of registered objects; and
    one or more processors configured to:
    set a first privacy mode of a first registered object first appearing in a monitoring zone among the plurality of privacy modes of the plurality of registered objects; and
    in the first privacy mode, in response to a request for a first image of the monitoring zone obtained by a camera from at least one of the plurality of registered objects other than the first registered object, generate a second image in which a privacy zone preset by the first registered object is processed in the first image.

11. The image processing device of claim 10, wherein the privacy zone comprises one of an entirety of the first image, a part of the first image, and the first registered object.

12. The image processing device of claim 10, wherein at least one of a size, a shape, and a position of the privacy zone is changed in the first image.

13. The image processing device of claim 10, wherein the one or more processors are further configured to: in the first image, when one of a detection of the first registered object, a voice recognition of the first registered object, and a face recognition of the first registered object preset by the first registered object is satisfied, set the privacy mode set by the first registered object.

14. The image processing device of claim 10, wherein the one or more processors are further configured to: detect a first touch of a mark indicating a menu hide status provided on a screen from a terminal of at least one of the plurality of registered objects and provide a wheel key in which at least one menu centered on a position of the first touch is displayed to the screen; and detect a second touch on the wheel key and perform a function of a menu corresponding to a position of the second touch.

15. The image processing device of claim 14, wherein the one or more processors are further configured to: when the menu corresponding to the position of the second touch is a privacy setting, receive privacy information comprising a change condition to a privacy mode and a setting of the privacy zone; and match the privacy information with an object that inputs the first and second touch.

16. The image processing device of claim 15, wherein the one or more processors are further configured to provide a block overlapped with the first image for zone designation; and receive an input to designate a zone surrounded by the block or a zone other than the zone surrounded by the block in the first image as the privacy zone.

17. The image processing device of claim 14, wherein the one or more processors are further configured to: when the menu corresponding to the position of the second touch is an event viewing, request authentication of an object requesting a privacy event which is an event occurring in the privacy zone upon receiving a request for the privacy event; and allow viewing of the privacy event when the object requesting the privacy event is authenticated as the first registered object.

18. The image processing device of claim 10, wherein the one or more processors are further configured to detect a third touch of a mark indicating a menu hide status provided on a screen from a terminal of at least one of the plurality of registered objects and provide a navigation key overlapped with the first image in response to the third touch; and detect a fourth touch of the navigation key and control a view of the camera with a coordinate value corresponding to the fourth touch.

19. The image providing method of claim 1, further comprising:
- displaying a user interface that provides a first option of setting the privacy zone to an entire area of the monitoring zone, a second option of setting the privacy zone to a partial area of the monitoring zone, and a third option of setting the privacy zone to an area of a designated object appearing in the monitoring zone; and
- in response to detecting the first registered object in the monitoring zone, setting the privacy zone of the first image based on an input of the first registered object that selects one of the first option, the second option, and the third option.

20. The image processing device of claim 10, further comprising a display,
- wherein the one or more processors are further configured to:
- control the display to display a user interface that provides a first option of setting the privacy zone to an entire area of the monitoring zone, a second option of setting the privacy zone to a partial area of the monitoring zone, and a third option of setting the privacy zone to an area of a designated object appearing in the monitoring zone; and
- in response to detecting the first registered object in the monitoring zone, set the privacy zone of the first image based on a user input for selecting one of the first option, the second option, and the third option.

* * * * *